United States Patent
Tanaka et al.

(10) Patent No.: US 8,831,510 B2
(45) Date of Patent: Sep. 9, 2014

(54) WIRELESS COMMUNICATION DEVICE, WIRELESS COMMUNICATION SYSTEM, CONTROLLING METHOD FOR WIRELESS COMMUNICATION DEVICE, AND RECORDING MEDIUM

(75) Inventors: Akio Tanaka, Tokyo (JP); Hiromu Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 260 days.

(21) Appl. No.: 13/055,821

(22) PCT Filed: Jul. 30, 2009

(86) PCT No.: PCT/JP2009/003611
§ 371 (c)(1),
(2), (4) Date: Jan. 25, 2011

(87) PCT Pub. No.: WO2010/041366
PCT Pub. Date: Apr. 15, 2010

(65) Prior Publication Data
US 2011/0124286 A1    May 26, 2011

(30) Foreign Application Priority Data
Oct. 6, 2008    (JP) .................................. 2008-259580

(51) Int. Cl.
*H04B 5/00* (2006.01)
*H04W 76/02* (2009.01)
*H04W 88/06* (2009.01)

(52) U.S. Cl.
CPC ............ *H04W 76/023* (2013.01); *H04W 88/06* (2013.01)
USPC ........ 455/41.1; 455/42.1; 455/41.3; 455/448; 455/550.1; 455/552.1

(58) Field of Classification Search
CPC ........ H04B 5/00; H04B 5/0037; H04B 5/003; H04B 5/0081; H04B 5/02; H04W 4/008; H04W 12/08; G06K 7/10237; G06Q 20/3278; G06Q 20/40; G06Q 20/4097; G06Q 30/0267; G06Q 50/30; H01Q 1/2291; H01Q 1/242
USPC ......... 455/41.1, 42.1, 550.1, 552.1, 41.3, 448
See application file for complete search history.

(56) References Cited

U.S. PATENT DOCUMENTS

| 2002/0040389 | A1* | 4/2002 | Gerba et al. .................. 709/219 |
| 2004/0263319 | A1* | 12/2004 | Huomo ........................ 340/10.2 |
| 2007/0032236 | A1* | 2/2007 | Kim et al. .................... 455/436 |
| 2009/0009295 | A1* | 1/2009 | Rofougaran .................. 340/10.1 |
| 2009/0189816 | A1* | 7/2009 | Nikitin et al. ................. 343/702 |
| 2013/0217326 | A1* | 8/2013 | Symons ....................... 455/41.1 |

FOREIGN PATENT DOCUMENTS

| JP | 2007258904 A | 10/2007 |
| JP | 2007318325 A | 12/2007 |
| JP | 2008191973 A | 8/2008 |
| WO | 2008056616 A | 5/2008 |

OTHER PUBLICATIONS

RF Circuit Design Theory and Applications by Reinhold Ludwig and Pavel Bretchko, 2000 by Printice-Hall, Inc., ISBN 0-13-095323-7, pp. 204-205.*
IEEE, and google.*
International Search Report for PCT/JP2009/003611 mailed Nov. 10, 2009.

* cited by examiner

*Primary Examiner* — Edward Urban
*Assistant Examiner* — Max Mathew
(74) *Attorney, Agent, or Firm* — Sughrue Mion, PLLC

(57) ABSTRACT

A near-field wireless communication circuit 10 included in a terminal 1A can perform switching between a normal mode and a near mode which has a relatively short communicable distance and a relatively high transmission rate as compared with those in the normal mode. Further, a controller 13 executes preliminary processing for starting data transmission and reception in the near mode to/from a terminal 1B serving as a communication destination between the terminals 1A and 1B by using the near-field wireless communication circuit 10 which is set to the normal mode. Further, the controller 13 determines the availability of the data transmission and reception in the near mode to/from the terminal 1B by using a measured value of communication quality which has a correlation with a communication distance to the terminal 1B as a measure of the determination. Furthermore, when it is determined that the data transmission and reception in the near node are available, the controller 13 starts the data transmission and reception to/from the terminal 1B by using the near-field wireless communication circuit 10 which is set to the near mode, based on a result of the preliminary processing executed in the normal mode in advance.

22 Claims, 20 Drawing Sheets

WIRELESS COMMUNICATION DEVICE, WIRELESS COMMUNICATION SYSTEM, CONTROLLING METHOD FOR WIRELESS COMMUNICATION DEVICE, AND RECORDING MEDIUM

This application is the National Phase of PCT/JP2009/003611, filed Jul. 30, 2009, which is based upon and claims the benefit of priority from Japanese patent application No. 2008-259580, filed on Oct. 6, 2008, the disclosure of which is incorporated herein in its entirety by reference.

TECHNICAL FIELD

The present invention relates to a technique for transferring data between wireless communication devices which conduct near-field wireless communication.

BACKGROUND ART

There has been known a technology for the near-field wireless communication, the communicable distance of which is from several meters to several tens of meters. For example, Wireless USB (Wireless USB Specification Revision 1.0) targets at a communication distance of about 10 meters. The Wireless USB assumes that a transmission rate is 480 Mbit/s at the communication distance of 3 meters, and that the transmission rate is 110 Mbit/s at the communication distance of 10 meters.

The Wireless USB adopts UWB (ultra Wide Band) as a wireless platform at a physical layer. The UWB uses a wide band from 3.1 GHz to 10.6 GHz, and achieves a transmission rate of several hundred Mbit/s or higher at a short distance within a 20 meter radius. As modulation methods for the UWB, there have been proposed an impulse wireless method, an MB-OFDM (MultiBand-Orthogonal Frequency Division Multiplexing) method, a DS (Direct Sequence)-UWB method for performing a direct spreading by PSK modulation, and the like. Communication devices using the MB-OFDM UWB method are disclosed in e.g. Patent Literatures 1 and 2. A communication device using the impulse wireless method is disclosed in e.g. Patent Literature 3.

Recently, there has been also proposed a wireless communication method where the communicable distance is confined to a near area of about several centimeters. For example, TransferJet is a wideband wireless communication method where a near area within 3 centimeters is assumed as the communicable distance. According to a statement issued by TransferJet consortium proposing the TransferJet (http://www.transferjet.org/en/index.html), the TransferJet uses a microwave band (central frequency 4.48 GHz). The average transmitted power is equal to or lower than −70 dBm/MHz, and the maximum transmission rate is 560 Mbit/s at the communication distance within 3 centimeters.

CITATION LIST

Patent Literature

[Patent Literature 1]
International Patent Publication No. WO2008/056616
[Patent Literature 2]
Japanese Unexamined Patent Application Publication No. 2007-258904
[Patent Literature 3]
Japanese Unexamined Patent Application Publication No. 2007-318325

SUMMARY OF INVENTION

Technical Problem

In a case of applying a wireless communication method such as the TransferJet where the communication distance is limited to the near area of several centimeters to a mobile terminal (e.g., mobile phone or PDA (Personal Digital Assistance)), there is caused a new problem that it is difficult for a user to perform input operation for the mobile terminal or a communication destination device (e.g., PC (Personal Computer) or kiosk terminal) while maintaining a state where the mobile terminal can communicate with the communication destination device.

As an example, assume a case where content is downloaded from the kiosk terminal to the mobile terminal. In this case, there is conceivable a case where preliminary processing with the input operation by the user should be performed, while maintaining a state where it is possible to conduct communication between the kiosk terminal and the mobile terminal. The preliminary processing refers to for example, mutual authentication between the terminals, input of user information, approval of a condition for using content, a selection of content to be downloaded, and processing for electronic payment. In a case where the user performs input operation on the preliminary processing for the mobile terminal, it is necessary for the user to perform the input operation while the user moves the mobile terminal closer to the kiosk terminal. Therefore, operability may be deteriorated. Further, in a case where the user performs input operation on the preliminary processing for the kiosk terminal, it is not preferable in terms of security to put the mobile terminal in a position away from the user who is working on the input, even for maintaining the state where it is possible to conduct communication between the kiosk terminal and the mobile terminal. Therefore, it is necessary to give special attention to the layout of a wireless communication circuit in the kiosk terminal, the design of a chassis, and the like.

The present invention has been made in view of the above-mentioned problems, and aims to improve operability by a user in a case of performing data transmission and reception wirelessly in a near area.

Solution to Problem

A wireless communication device according to a first exemplary aspect of the present invention includes a near field wireless communication circuit capable of performing switching between a first communication mode and a second communication mode that has a relatively short communicable distance and a relatively high transmission rate as compared with those in the first communication mode, and a control means for controlling the switching between the first and second communication modes. The control means executes preliminary processing to start data transmission and reception in the second communication mode to/from a communication destination device between the wireless communication device and the communication destination device through the near field wireless communication circuit that is set to the first communication mode. Further, the control means determines the availability of the data transmission and reception in the second communication mode to/from the communication destination device by using a measured value of communication quality that has a correlation with a communication distance to the communication destination device as a measure of the determination. Furthermore, the control means starts, when it is determined that the data transmission and reception are available, the data transmission and reception by using the near field wireless communication circuit that is set to the second communication mode, based on a result of the preliminary processing.

A wireless communication system according to a second exemplary aspect of the present invention includes first and second communication devices. Each of the first and second communication devices includes a near field wireless communication circuit capable of performing switching between a first communication mode and a second communication mode that has a relatively short communicable distance and a relatively high transmission rate as compared with those of the first communication mode. The first and second communication devices execute preliminary processing to start data transmission and reception in the second communication mode between the first and second communication devices through the respective near field wireless communication circuits that are set to the first communication mode. Further, the first communication device determines the availability of the data transmission and reception in the second communication mode to/from the second communication device by using a measured value of communication quality that has a correlation with a communication distance as a measure of the determination. When it is determined that the data transmission and reception are available, the first and second communication devices start the data transmission and reception by using the respective near field wireless communication circuits that are set to the second communication mode, based on a result of the preliminary processing.

A controlling method for a wireless communication device according to a third exemplary aspect of the present invention is the one of controlling the wireless communication device including a near field wireless communication circuit capable of performing switching between a first communication mode and a second communication mode that has a relatively short communicable distance and a relatively high transmission rate as compared with those of the first communication mode. This method includes the following (a) to (c):

(a) executing preliminary processing to start data transmission and reception in the second communication mode to/from a communication destination device between the wireless communication device and the communication destination device through the near field wireless communication circuit that is set to the first communication mode;

(b) determining the availability of the data transmission and reception in the second communication mode to/from the communication destination device by using a measured value of communication quality that has a correlation with a communication distance to the communication destination device as a measure of the determination; and (c) starting, when it is determined that the data transmission and reception are available, the data transmission and reception by using the near field wireless communication circuit that is set to the second communication mode, based on a result of the preliminary processing.

A recording medium according to a fourth exemplary aspect of the present invention stores a program for causing a computer to execute control processing for a wireless communication device including a near field wireless communication circuit capable of performing switching between a first communication mode and a second communication mode that has a relatively short communicable distance and a relatively high transmission rate as compared with those of the first communication mode. This control processing includes the following (a) to (c):

(a) executing preliminary processing to start data transmission and reception in the second communication mode to/from a communication destination device between the wireless communication device and the communication destination device through the near field wireless communication circuit that is set to the first communication mode;

(b) determining the availability of the data transmission and reception in the second communication mode to/from the communication destination device by using a measured value of communication quality that has a correlation with a communication distance to the communication destination device as a measure of the determination; and (c) causing, when it is determined that the data transmission and reception are available, the near field wireless communication circuit that is set to the second communication mode to start the data transmission and reception, based on a result of the preliminary processing.

Advantageous Effects of Invention

According to each of the above-mentioned first to fourth exemplary aspects of the present invention, it is possible to improve operability by a user in a case of performing data transmission and reception wirelessly in a near area.

DESCRIPTION OF EMBODIMENTS

Hereinafter, specific exemplary embodiments to which the present invention is applied will be described in detail with reference to the drawings. The same signs are assigned to the same elements throughout the drawings, and their duplicated explanation is omitted as appropriate for clarifying the description.

First Exemplary Embodiment of the Invention

Figure 1:
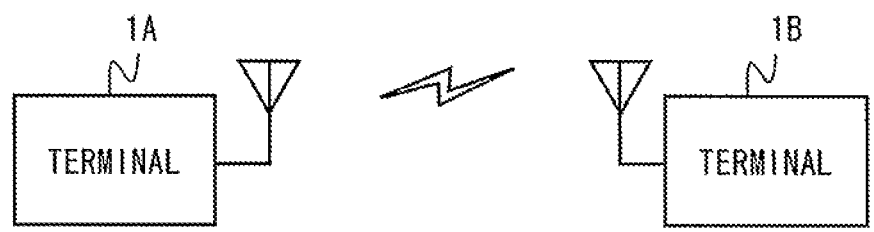
FIG. 1 is a configuration diagram of a wireless communication system according to a first exemplary embodiment of the present invention.

FIG. 1 shows configuration of a wireless communication system according to this exemplary embodiment. The wireless communication system according to this exemplary embodiment includes terminals 1A and 1B which conduct near-field wireless communication. Each of the terminals 1A and 1B can switch its operation mode between a normal mode for conducting the near-field wireless communication (e.g., within about 10 meters) and a near mode for conducting wireless communication in a nearer area (e.g., within several centimeters) as compared with that in the normal mode.

Figure 2:
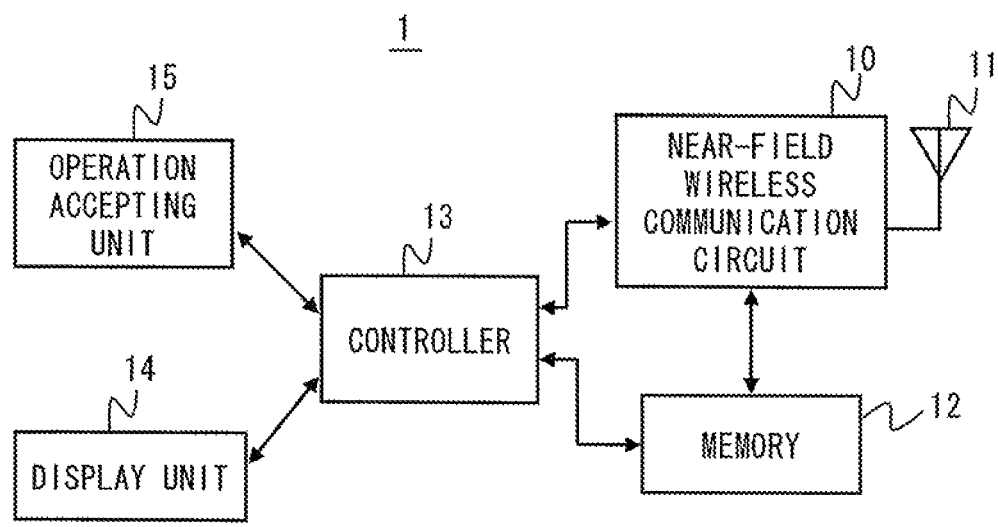
FIG. 2 is a block diagram showing, a configuration example of each of terminals shown in FIG. 1.

FIG. 2 is a block diagram showing a configuration example of each of the terminals 1A and 1B. In FIG. 2, a near-field wireless communication circuit 10 is a wireless interface for conducting the near-field wireless communication with another terminal (1A or 1B). The near-field wireless communication circuit 10 acquires transmission data from a memory, and outputs to an antenna 11 a transmission signal obtained by performing various processes such as generation of MAC (Media Access Control) frames, modulation, D/A conversion, frequency conversion, and signal amplification. Further, the near-field wireless communication circuit 10 inputs therein a wireless signal received by the antenna 11, and stores in a memory 12 reception data obtained by performing various processes such as signal amplification, frequency conversion, A/D conversion, and demodulation.

Further, the near-filed wireless communication circuit 10 operates in at least two modes (normal mode and near mode) whose communicable distances and transmission rates are different with each other. The normal mode is an operation mode for conducting the near-field wireless communication (e.g., within about 10 meters). On the other hand, the near mode is an operation mode for conducting the wireless communication in the nearer area (e.g., within several centimeters) as compared with that in the normal mode.

Figure 4A:
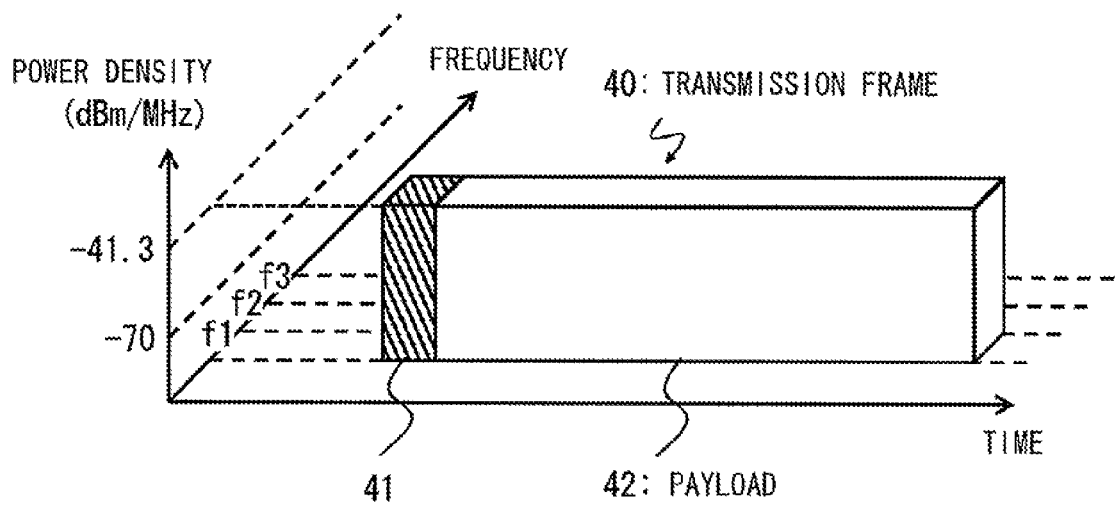
FIG. 4A is a diagram showing one example of a method of performing switching between a normal mode and a near mode.
Figure 4B:
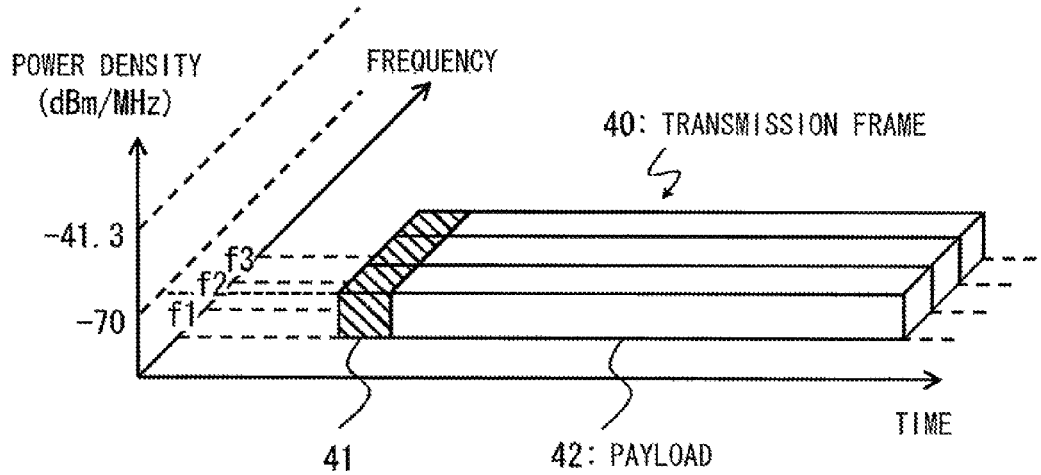
FIG. 4B is a diagram showing another example of the method of performing the switching between the normal mode and the near mode.

Described next is a specific example of switching between the normal mode and the near mode. For example, in a case where the near-field wireless communication circuit 10 is a UWB communication circuit using the MB-OFDM method, wireless parameters in the normal mode and the near mode may be set respectively as shown in FIGS. 4A and 4B. FIG. 4A shows an example of the wireless parameters in the normal mode. On the other hand, FIG. 4B shows an example of the wireless parameters in the near mode. In FIGS. 4A and 4B, each transmission frame 40 indicates the one generated at a MAC layer in the UWB. The transmission frame 40 includes a preamble and a header 41, and a payload 42.

In the example in FIG. 4A, multi-channel transmission in the OFDM is performed by using a plurality of subcarriers which are included in one sub-band f1 (528 MHz width) in a band from 3.1 GHz to 10.6 GHz. In the normal mode, there is set a relatively high transmitted power density as compared with that in the near mode. For example, as shown in FIG. 4A, the transmitted power density may be controlled in order that the average transmitted power may become equal to or lower than −41.3 dBm/MHz. Further, in the normal mode, frequency hopping may be performed between plural sub-bands f1, f2 and f3, which belong to the same band group. A specific example of such a UWB communication circuit is disclosed in detail in the patent application (Patent Literature 1) which has been previously made by one of inventors of this application.

In the example in FIG. 4B, the multi-channel transmission in the OFDM is performed by simultaneously using three sub-bands f1, f2 and f3, and by using a group of subcarriers included in these three bands. That is, in the example in FIG. 4B, there is used a wider bandwidth (about 1.6 GHz width) than that in the normal mode, so that it is achieved to speed up a data transmission rate. In the near mode, there is set a lower transmitted power density than that in the normal mode. For example, as shown in FIG. 4B, the transmitted power density may be controlled in order that the average transmitted power may become equal to or lower than −70 dBm/MHz. Thus, the communicable distance can be confined to the near area (e.g., within several centimeters). A specific example of the UWB communication circuit, which simultaneously uses plural sub-bands as shown in FIG. 4B, is disclosed in detail in the patent application (Japanese patent application No. 2008-115389, filed on Apr. 25, 2008) which has been previously made by one of the inventors of this application.

Figure 3:
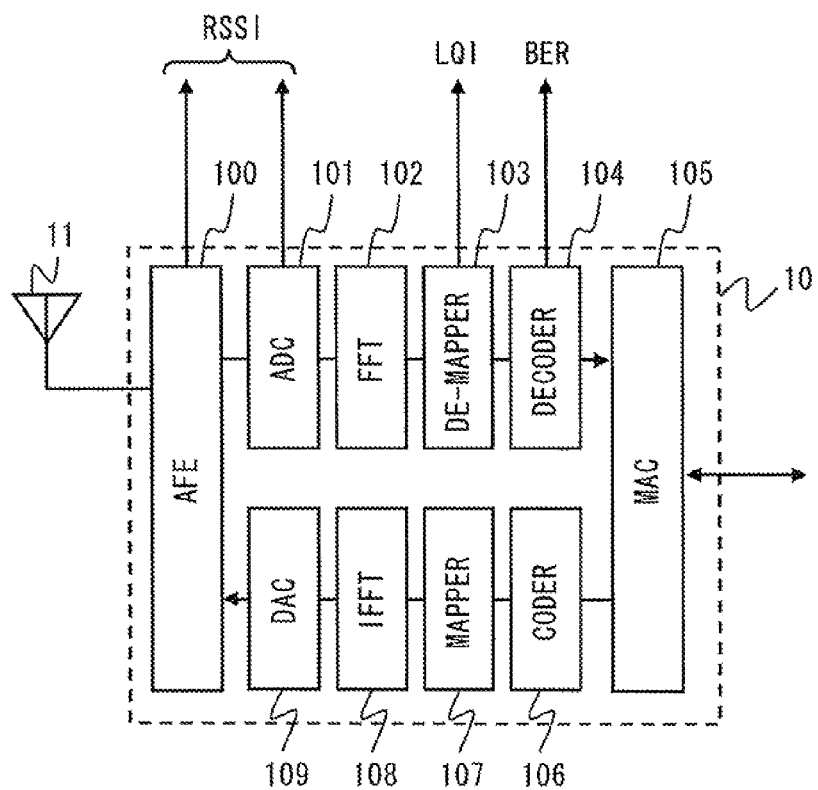
FIG. 3 is a block diagram showing a configuration example of a near-field wireless communication circuit shown in FIG. 2.

FIG. 3 is a block diagram of the near-field wireless communication circuit 10 in a case of adopting the MB-OFDM method. An analog front end (AFE) 100 performs frequency conversion (up-converting) and signal amplification for a transmission signal output from a D/A converter (DAC) 109, and thus outputs the obtained wireless signal to the antenna 11. Further, the AFE 100 performs signal amplification and frequency conversion (down-converting) for the wireless signal received by the antenna II, and thus outputs the obtained baseband signal or IF (Intermediate Frequency) signal to an A/D converter (ADC) 101.

The ADC 101, an FFT unit 102, a de-mapper 103 and a decoder 104 are processing circuits for the received signal. The ADC 101 performs digital sampling for the received signal. The FFT unit 102 performs FFT operation for the received signal after sampling to perform OFDM demodulation. The de-mapper 103 restores transmission data from received symbols (information on phases and amplitude) of each subcarrier obtained by the FFT operation, and performs parallel-serial conversion for the transmission data to be output to the decoder 104. The decoder 104 performs descrambling, error correction and the like for data column restored by the de-mapper 103, and then outputs it to a MAC unit 105.

The MAC unit 105 performs generation and decomposition of UWB MAC frames, and MAC layer control. A coder 106, a mapper 107, an IFFT unit 108 and the DAC 109 on the transmission side perform inverse processing to the above-mentioned processing units on the reception side (ADC 101, FFT unit 102, de-mapper 103 and decoder 104).

In the configuration example shown in FIG. 3, it is possible to acquire, as information on communication quality of the received signal, an RSSI (Received Signal Strength Indicator) which can be obtained in the AFE 100 or the ADC 101, an LQI (Link Quality Indicator) which can be obtained in the de-mapper 103, and a symbol error rate (BER: Bit Error Rate) which can be obtained in the decoder 104. The information on communication quality has a correlation with a communication distance to a communication destination device, and thus can be used for determining the availability of communication in the near mode with the communication destination device. Details about the determination of the availability of the communication in the near mode by use of the information on communication quality will be described later.

Hereinbefore, there have been described the specific examples of the configuration of the near-field wireless communication circuit 10 shown in FIG. 2 and the switching of the operation mode. Note that it is obvious that each switching of the operation mode shown in FIGS. 4A and 4B is no more than an example. For example, the data transmission rate may be modified by changing the modulation method (e.g., between binary modulation and multilevel modulation), a baud rate, or the number of channels by MIMO (Multiple-Input Multiple-Output). Further, the near-field wireless communication circuit 10 is not limited to the one using the MB-OFDM method, but may be another UWB communication circuit using the impulse wireless, the DS-UWB or the like, or may be another near-field wireless communication circuit.

Returning to FIG. 2, the description is continued. The memory 12 stores transmission and reception data of the near-field wireless communication circuit 10, image data to be output to a display unit 14 which will be described later, a computer program to be executed by a controller 13, and the like. Note that the memory 12 shown in FIG. 2 represents a logical structural unit. That is, the memory 12 is made by a combination of a ROM (Read Only Memory), a RAM (Random Access Memory), a flash memory, and the like.

The controller 13 performs overall control in the terminal 1 (1A or 1B), and controls data transmission and reception with the near-field wireless communication circuit 10 to/from a different terminal. Mentioned in more detail, the controller 13 performs execution control for preliminary processing which is executed in the normal mode between the terminal 1 and the different terminal in advance of data transmission in the near mode. Further, the controller 13 controls switching from the normal mode to the near mode and the start of data transmission and reception in the near mode, based on a measurement result of communication quality with the different terminal. Details about the preliminary processing will be described later.

The display unit 14 includes a display device such as an LCD (Liquid Crystal Display) or an organic EL (Electro-Luminescence) display, and thus outputs a message or the like generated by the controller 13.

An operation accepting unit 15 includes input devices such as operation buttons, a keyboard and a touch panel, and thus accepts input operation by a user of the terminal 1.

Figure 5:
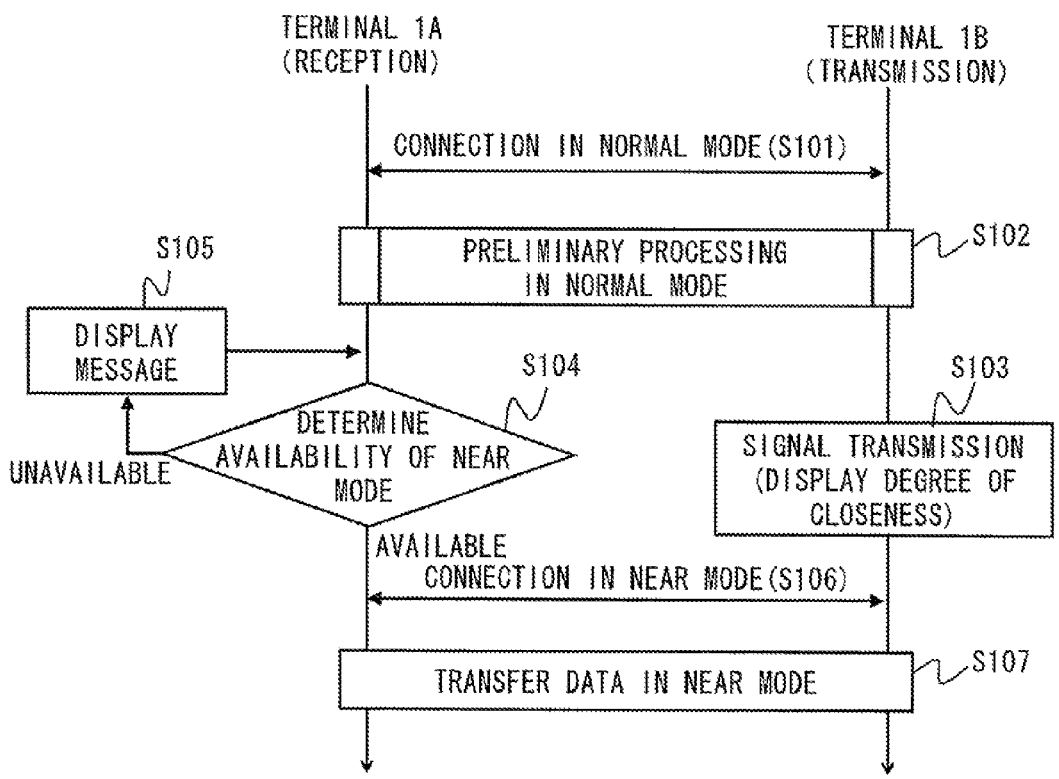
FIG. 5 is a sequence diagram on data transfer processing between the terminals shown in FIG. 1.

Hereinafter, data transfer processing in the near mode, which is executed between the terminals 1A and 1B, will be described in detail. FIG. 5 is a sequence diagram showing the data transfer processing executed between the terminals 1A and 1B. Note that in FIG. 5, the terminal 1A serves as the reception side upon data transfer in the near mode, and the terminal 1B serves as the transmission side.

At Step S101, the terminals 1A and 1B are connected to each other in the normal mode by using the respective near-field wireless communication circuits 10, based on the control by the controller 13 included in each of the terminals 1A and 1B. At Step S102, the terminals 1A and 1B execute, in the normal mode, preliminary processing on data transmission and reception in the near mode to be performed later. The preliminary processing is executed with at least one of the input operation by the user to the operation accepting unit 15 in at least one of the terminals 1A and 1B, and displaying the message to the user by the display unit 14 in at least one of the terminals 1A and 1B. For example, the preliminary processing includes at least one of (a) checking vacancy in the memory for reception of the terminal 1A from the terminal 1B and displaying a result of the check to the user, (b) removing data from the memory for reception of the terminal 1A in response to the input operation by the user to the terminal 1A or 1B, (c) designating, by the user, content to be transferred in the near mode from the terminal 1B to the terminal 1A, (d) making electronic payment with the input operation by the user to the terminal 1A or 1B, and (e) authenticating a communication destination terminal (1A or 1B) with the input operation by the user to the terminal 1A or 1B.

Figure 6:
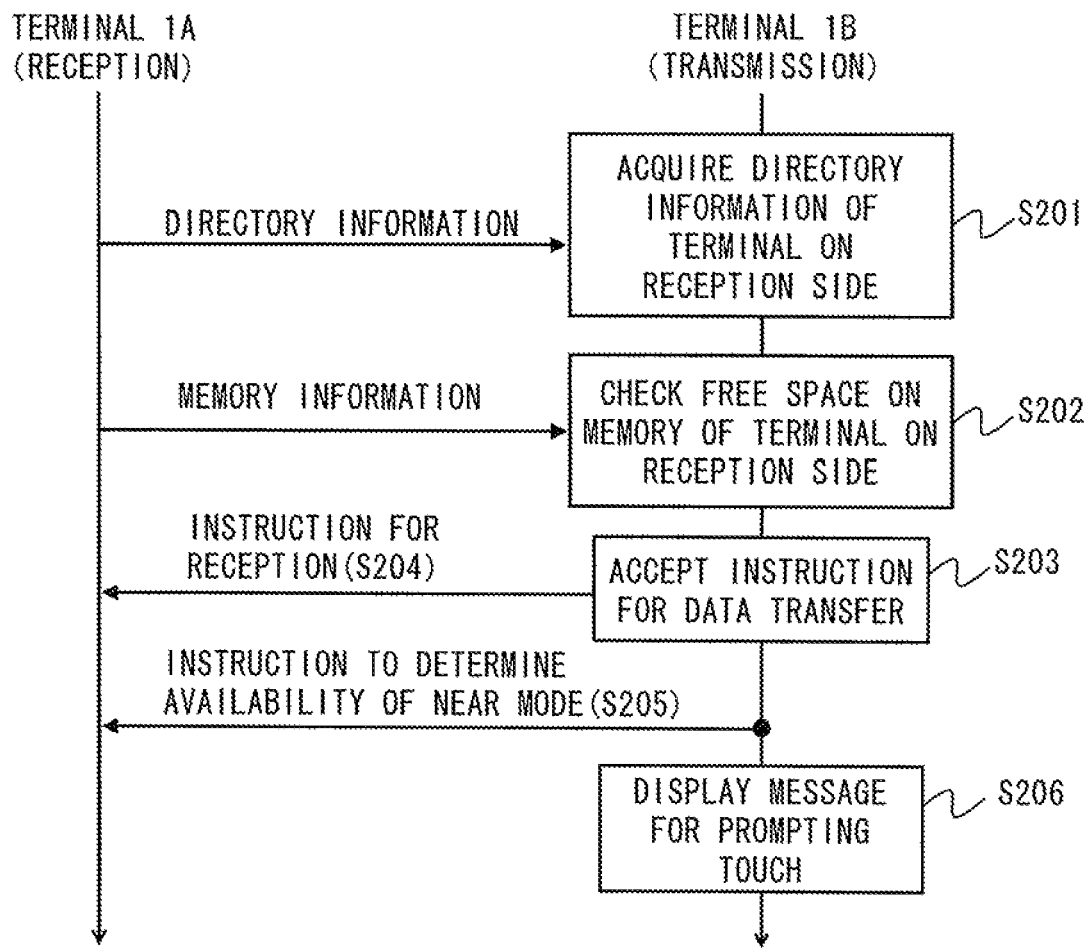
FIG. 6 is a sequence diagram showing one example of preliminary processing which is included in the data transfer processing shown in FIG. 5.

Specific examples of the preliminary processing will be described by using sequence diagrams in FIGS. 6 and 7. FIG. 6 indicates a procedure where the user operates the terminal 1B serving as the data transmission side, thereby checking the availability of reception at the terminal 1A serving as the data reception side. At Step S201, the terminal 1B acquires directory information of the terminal 1A. At Step S202, the terminal 1B acquires a free space on the memory 12 included in the terminal 1A.

At Step S203, the display unit 14 in the terminal 1B displays the directory information and the free space on the memory of the terminal 1A. Then, the controller 13 in the terminal 1B acquires an instruction to transfer data from the terminal 1B to the terminal 1A by the input operation by the user to the operation accepting unit 15. The controller 13 in the terminal 1B transmits an instruction to receive the data to the terminal 1A through the near-field wireless communication circuit 10, according to the acquisition of the instruction to transfer the data (Step S204). The terminal 1A, which has received the instruction to receive the data, prepares for receiving the data by activating an application program for receiving the data, or the like.

At Step S205, the controller 13 in the terminal 1B transmits an instruction to perform the determination of the availability of the near mode to the terminal 1A through the near-field wireless communication circuit 10. The determination of the availability of the near mode is a process to determine whether the terminals 1A and 1B are located in the near area where it is possible to transfer the data in the near mode. At Step S206, in order to be able to transfer the data in the near mode, the display unit 14 in the terminal 1B displays a message for prompting the user to perform operation (touch operation) to move one of the terminals 1A and 1B closer to another. Note that the message for prompting the touch operation may be displayed by the display unit 14 in the terminal 1A.

Figure 7:
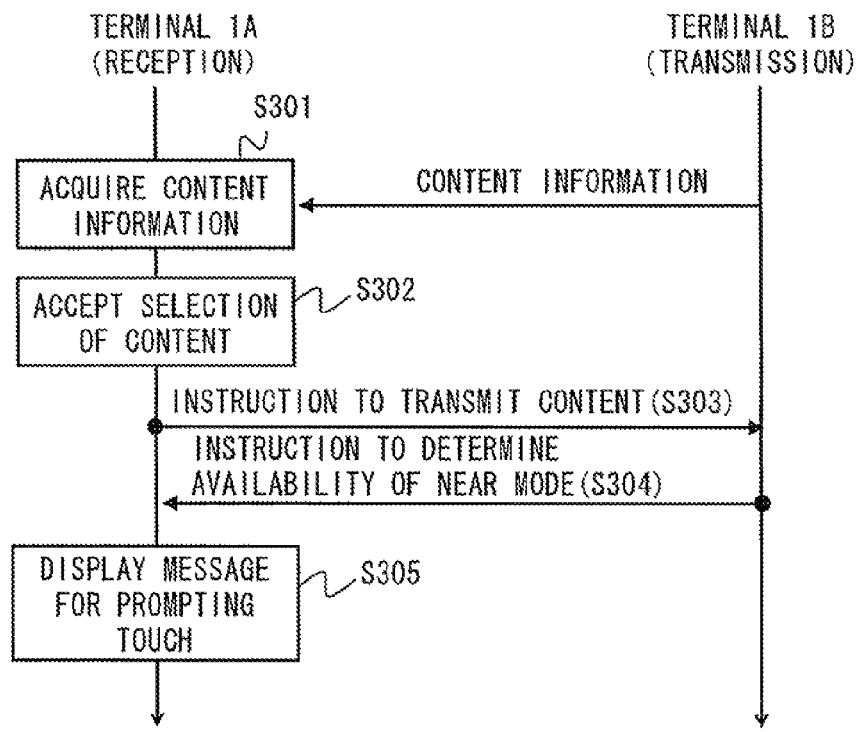
FIG. 7 is a sequence diagram showing another example of the preliminary processing which is included in the data transfer processing shown in FIG. 5.

Another example of the preliminary processing is described by using FIG. 7. FIG. 7 indicates a procedure where the user operates the terminal 1A serving as the data reception side, thereby selecting content to be acquired from the terminal 1B serving as the data transmission side. At Step S301, the terminal 1A acquires information on content (name of content, creator, created date and time, data size, price, and the like) held by the terminal 1B. At Step S302, the display unit 14 in the terminal 1A displays the information on content acquired from the terminal 1B. Then, the controller 13 in the terminal 1A accepts a selection of content to be transferred by the input operation by the user to the operation accepting unit 15.

At Step S303, the controller 13 in the terminal 1A transmits, to the terminal 1B through the near-field wireless communication circuit 10, an instruction to transmit the selected content. The terminal 1A, which has transmitted the instruction to transmit the content, prepares for receiving data by activating an application program for receiving the data, or the like. At Step S304, the controller 13 in the terminal 1B transmits the instruction to perform the determination of the availability of the bear mode to the terminal 1A through the near-field wireless communication circuit 10. The terminal 1A, which has received the instruction to perform the determination of the availability of the near mode, displays a message for prompting the user to perform the touch operation. Note that the message for prompting the touch operation may be displayed by the display unit 14 in the terminal 1B.

Returning to FIG. 5, Step S103 and the subsequent Steps are described. At Step S103, in order to determine the availability of the near mode, the terminal 1B transmits a wireless signal to the terminal 1A. At Step S104, the terminal 1A performs determination of the availability of data reception in the near mode. The determination may be performed by using reception quality in the terminal 1A of the wireless signal transmitted from the terminal 1B. Specific examples of the determination will be described later.

When it is determined that the data reception in the near mode is unavailable at Step S104, the terminal 1A displays a message for the user (Step S105). For example, the message may be the one for continuously prompting the touch, the one indicating out of the near mode, the one indicating a degree of closeness of the terminals 1A and 1B, or the like. Further, an image may be displayed as a substitute for displaying the message or by combining it therewith. Further, the display may be performed by LEDs (Light Emitting Diodes) as a substitute for displaying the message or by combining them. For example, the degree of closeness of the terminals 1A and 1B may be indicated by the number of lighted LEDs, the color of a lighted LED, or the like. Furthermore, the display of the message at Step S105 may be performed by the display unit 14 in the terminal 1B.

On the other hand, when it is determined that the data reception in the near mode is available at Step S104, the terminals 1A and 1B are connected to each other in the near mode (Step S106). Finally, at Step S107, the terminals 1A and 1B perform the data transmission and reception in the near mode.

Figure 8:
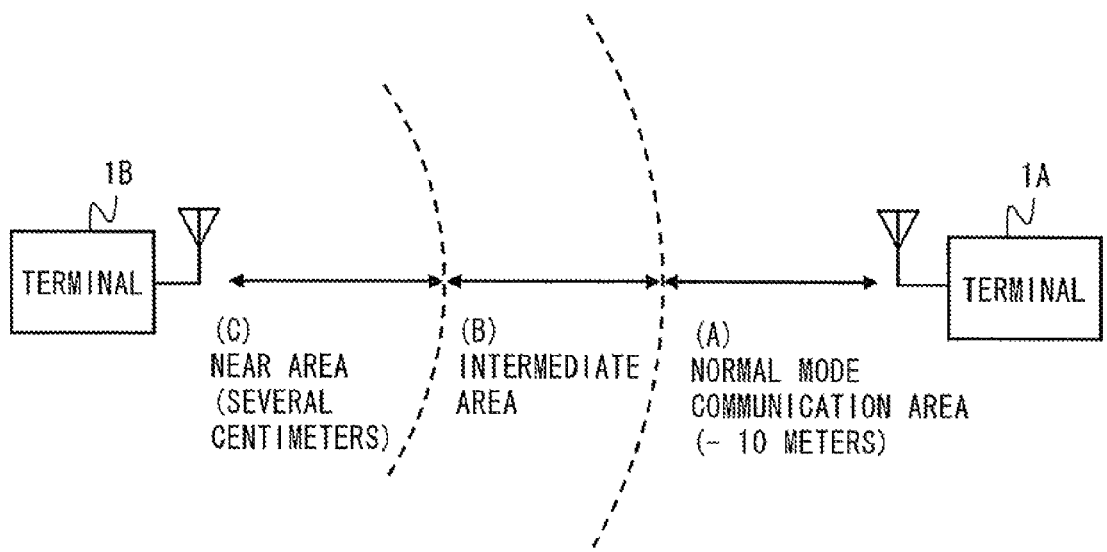
FIG. 8 is a diagram showing an arrangement example of the terminals for explaining determination of the availability of the near mode.

Hereinafter, specific examples of the determination of the availability of the near mode will be described by using FIGS. 8 to 12. FIG. 8 is a diagram showing an arrangement example of the terminals for explaining the determination of the availability of the near mode. As shown in FIG. 8, an area (e.g., within about 10 meters), where it is possible to conduct communication in the normal mode, but it is not possible to conduct communication in the near mode, is referred to as "normal mode communication area". Further, an intermediate area, between the "normal mode communication area" and the "near area" where it is possible to perform the data transmission and reception in the near mode, is referred to as "intermediate area".

Figure 9:
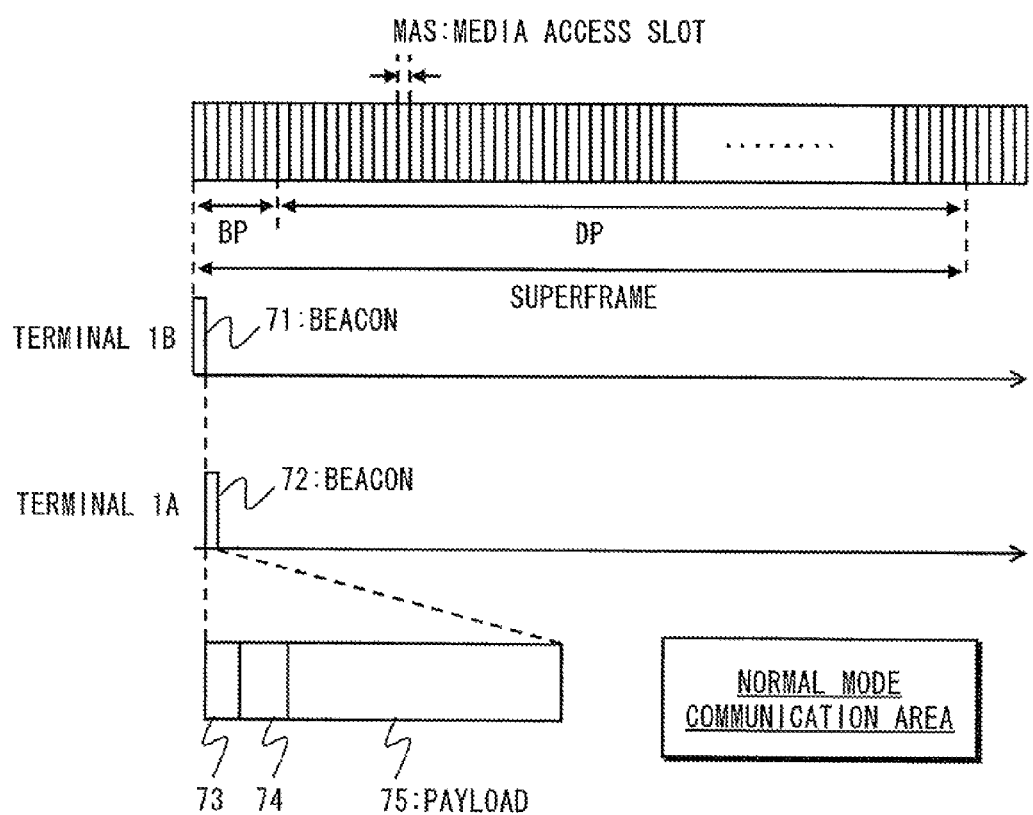
FIG. 9 is a diagram showing an example of transmission data from the terminal which is located in a normal mode communication area in FIG. 8.

Upon starting the determination of the availability of the near mode, the terminals 1A and 1B conduct communication in the normal mode. That is, the terminal 1A receives a wireless signal transmitted in the normal mode from the terminal 1B, and measures reception quality of this wireless signal. FIG. 9 is a diagram showing transmission signals from the terminals 1A and 1B in the "normal mode communication area". Note that FIG. 9 shows an example in a case where the near-field wireless communication circuit 10 serves as the UWB communication circuit. As shown in FIG. 9, the terminals 1A and 1B mutually transmit beacon signals 71 and 72, and thus establish synchronization of a superframe. The superframe is a transmission frame prescribed by the UWB MAC, and one superframe period is 65.536 msec. The superframe is divided into 256 MASs (Medium Access Slots). One MAS-period is 256 pee. The beginning part of the superframe is assigned as a period (referred to as Beacon Period) for transmitting the beacon signal which is used for establishing the synchronization of the superframe and for transferring various control signals. Each of the beacon signals 71 and 72 includes a preamble 73, a header 74, and a payload 75. In FIG. 9, "BP" indicates the Beacon Period, and "DP" indicates Data Period.

In the normal mode communication area, the terminal 1A receives the beacon signal 71 transmitted from the terminal 1B, and measures reception quality of the beacon signal 71. As the reception quality of the beacon signal 71, an RSSI of the preamble 73 and an RSSI of the payload 75 may be measured. Note that the measurement of the reception quality may be performed with respect not only to any one of the above-mentioned RSSI, LQI and BER, but to two or more measures. In this exemplary embodiment, a distance (degree of closeness)* between the terminals 1A and 1B is determined by using measured values of the reception quality such as the RSSI, the LQI and the BER as measures. It can be generally judged that the distance between the terminals 1A and 1B becomes shorter as the RSSI become higher. However, in a case of measuring noise power, there is decreased a correlation between the RSSI and the distance (degree of closeness) between the terminals 1A and 1B. Further, although the BER is generally improved when the distance between the terminals gradually becomes shorter, the BER deteriorates in contrast when the distance between the terminals is so short that it exceeds a dynamic range of the terminal on the reception side. Therefore, for example, measurement of the BER after decoding and measurement of the RSSI may be used together.

Figure 10:
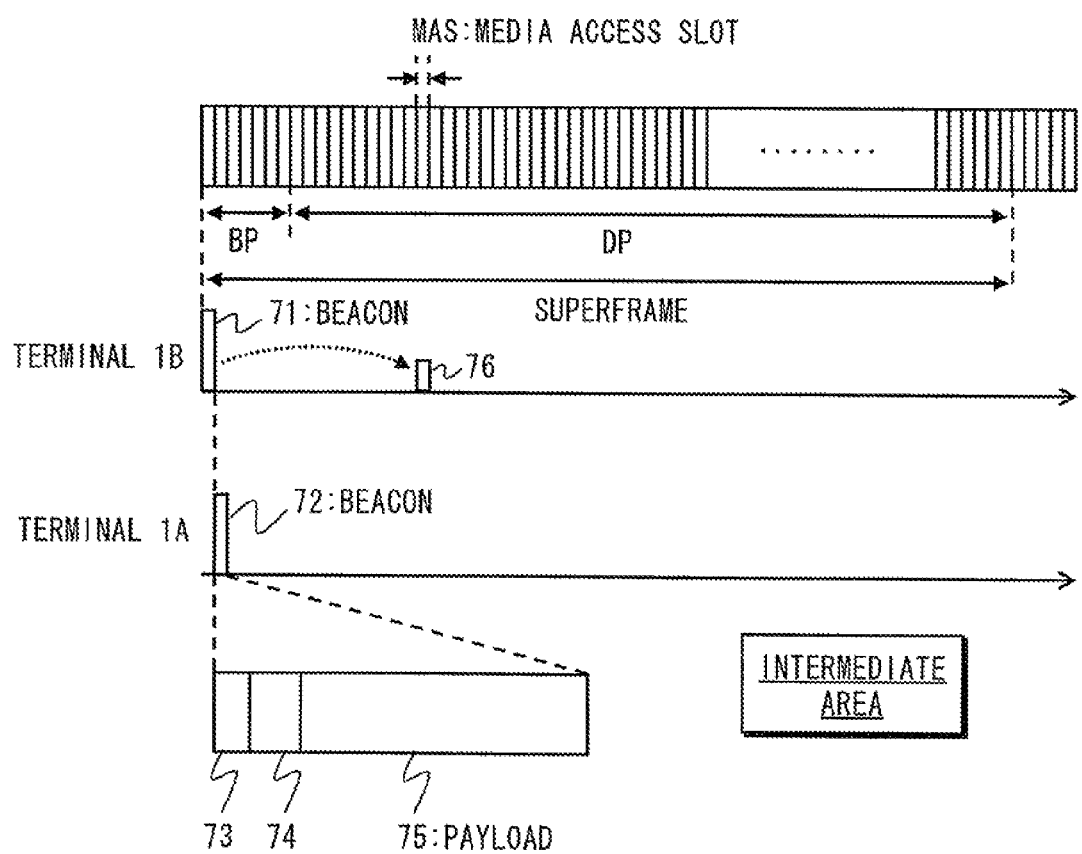
FIG. 10 is a diagram showing an example of transmission data from the terminal which is located in an intermediate area in FIG. 8.

FIG. 10 is a diagram showing transmission signals from the terminals 1A and 1B in the "intermediate area". In the intermediate area, the terminals 1A and 1B transmit the beacon signals 71 and 72 in the normal mode. Further, the terminal 1B transmits a wireless signal 76 in the near mode by using the MAS other than that during the Beacon Period. At this time, a transmission timing of the wireless signal 76 in the near mode may be designated by the beacon signal 71.

As shown in FIG. 10, the beacon signals 71 and 72 are transmitted in the normal mode. Thus, there is a low possibility that each of the terminals 1A and 1B fails in the reception of the beacon signal, so that the synchronization of the superframe can be maintained. Further, the transmission timing of the wireless signal 76 is notified by using the beacon signal transmitted in the normal mode. Thus, the transmission timing can be reliably transmitted to the terminal 1A. Therefore, it is not necessary for the terminal 1A to perform reception operation for long periods of time. Further, it takes a short period of time for the wireless signal 76 to occupy the superframe. Thus, it is possible to ensure time when another terminal can perform the data transmission and reception.

In the example shown in FIG. 10, the terminal 1A may determine the degree of closeness of the terminals 1A and 1B by measuring the reception quality of the beacon signal 72 transmitted in the near mode.

Figure 11:
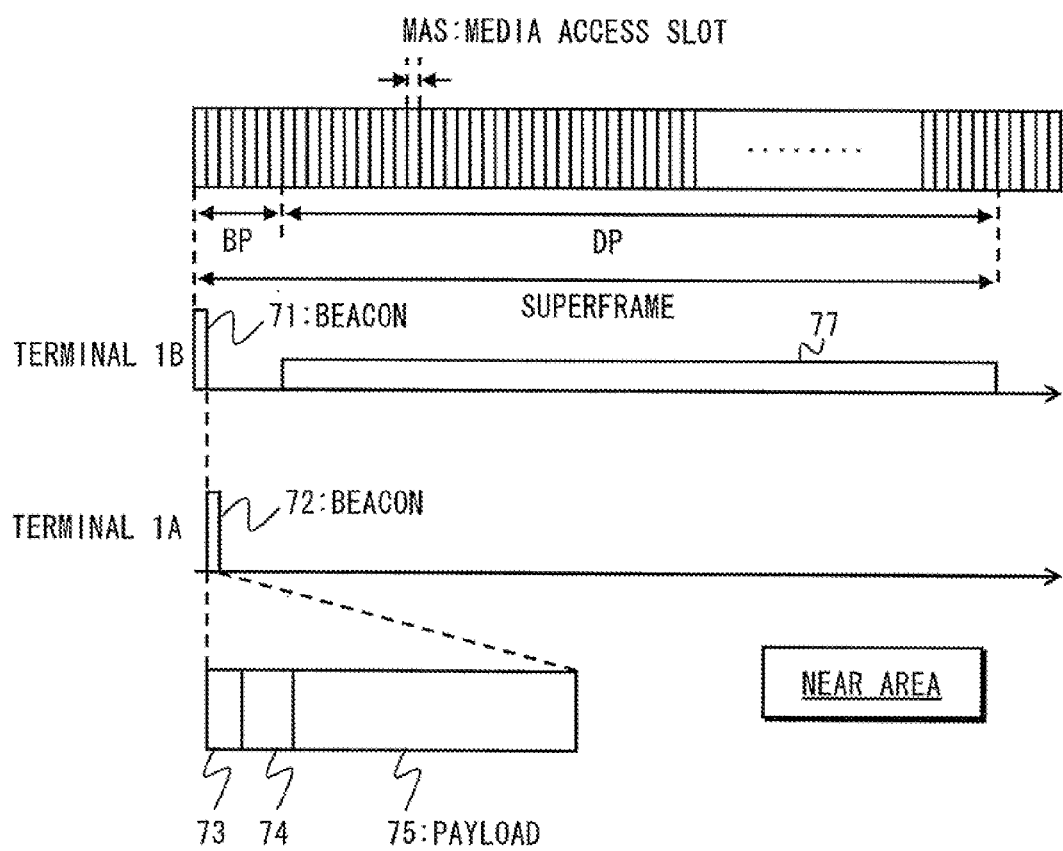
FIG. 11 is a diagram showing one example of transmission data from the terminal which is located in a near area in FIG. 8.

FIG. 11 is a diagram showing transmission signals from the terminals 1A and 1B in the "near area". In the example in FIG. 11, the terminals 1A and 1B transmit the beacon signals 71 and 72 in the normal mode also in the near area. It is possible to notify the presence of the terminals 1A and 1B to a different terminal which is located around the terminals 1A and 1B, by continuing the transmission of the beacon signal in the normal mode as shown in FIG. 11. Therefore, it is possible to prevent occurrence of such a problem that the MAS for transmitting the beacon signal collides with that for the neighboring terminal.

Further, the terminal 1B transmits a wireless signal 77 in the near mode by using the MASs other than those during the Beacon Period. The wireless signal 77 is a signal which includes transmission data from the terminal 1B to the terminal 1A. There is reduced overhead (time not contributing to the data transmission) by using the MASs other than those during the Beacon Period within the superframe as much as possible for the data transmission in the near mode, so that it is possible to improve an effective data transmission rate.

Figure 12:
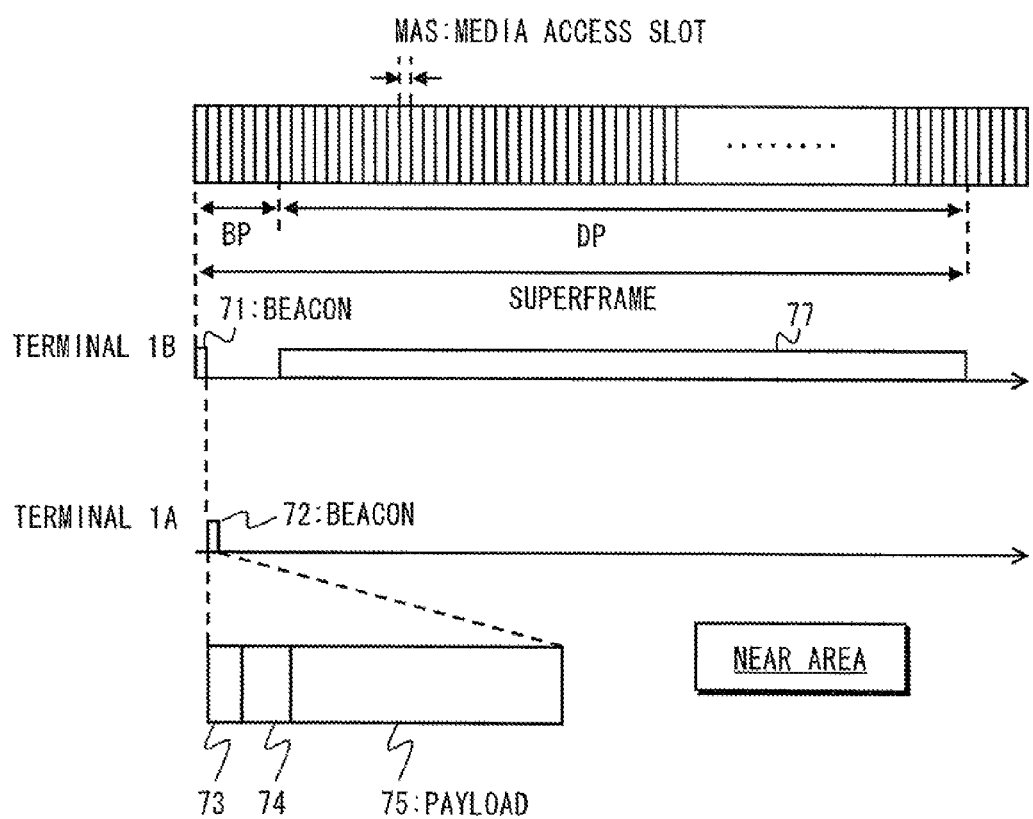
FIG. 12 is a diagram showing another example of the transmission data from the terminal which is located in the near area in FIG. 8.

FIG. 12 is a diagram showing another example of the transmission signals from the terminals 1A and 1B in the "near area". In the example in FIG. 12, the beacon signals 71 and 72 are transmitted in the near mode. Thus, the beacon signals 71 and 72 cannot be detected by a terminal other than the terminals 1A and 1B which are located in the near area. Therefore, it is possible to further lower a possibility that the wireless signal 77 which includes the data signal is sniffed.

By the way, FIGS. 9 to 12 show examples where the measurement of the reception quality in the normal mode and that in the near mode are used together upon performing the determination of the availability of the near mode. Thus, the terminal 1A can continuously measure the reception quality at the whole range of the normal mode communication area, the intermediate area, and the near area. Therefore, the terminal 1A can properly display the degree of closeness of the terminals 1A and 1B at the whole range of the normal mode communication area, the intermediate area, and the near area. Further, the final determination of the availability is performed based on the reception quality in the near mode. therefore, it is possible to improve accuracy of the determination. Meanwhile, measurement of the reception quality may be performed in only one of the normal mode and the near mode at the whole range of the normal mode communication area, the intermediate area and the near area, and the determination of the availability of the near mode may be performed based on a result of this measurement.

As mentioned above, the wireless communication system according to this exemplary embodiment performs, in the normal mode, the preliminary processing to be executed between the terminals 1A and 1B in advance of the data transmission and reception in the near mode. Thus, it is not necessary for the user to move one of the terminals 1A and 1B too closer to another upon performing the preliminary processing. Accordingly, it is possible to improve the operability by the user in a case of performing the data transmission and reception wirelessly in the near area.

Note that in the above-mentioned description, there is shown the examples where the wireless signal is transmitted by the terminal 1B and received by the terminal 1A upon the determination of the availability of the near mode. Meanwhile, the wireless signal may be transmitted by the terminal 1A and received by the terminal 1B. Further, the signal transmission and reception upon the determination of the availability of the near mode may be bidirectionally performed.

Second Exemplary Embodiment of the Invention

A wireless communication system according to this exemplary embodiment includes terminals 2A and 2B which conduct near-field wireless communication. At least one of the terminals 2A and 2B includes a function of searching a terminal which is compatible with the near mode (hereinafter, near mode-compatible terminal). Note that configuration of the terminals 2A and 2B may be similar to that of the terminals 1A and 1B described in the first exemplary embodiment of the invention. Further, a procedure of data transmission and reception in the near mode between the terminals 2A and 2B may be similar to that between the terminals 1A and 1B, with the exception that the search of the near mode-compatible terminal is performed.

Figure 13:
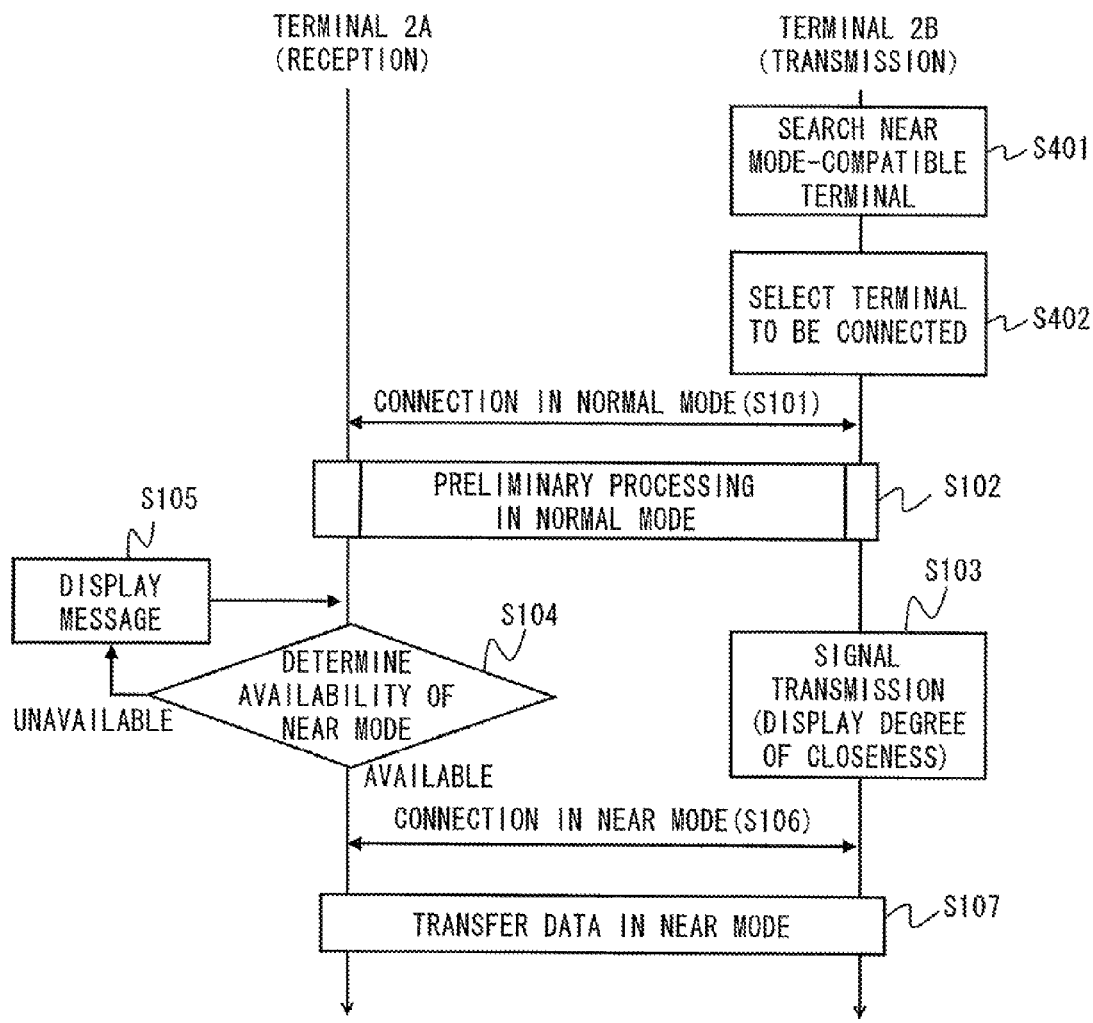
FIG. 13 is a sequence diagram on data transfer processing in a wireless communication system according to a second exemplary embodiment of the present invention.

FIG. 13 is a sequence diagram showing processing for data transmission and reception performed between the terminals 2A and 2B. Note that in FIG. 13, the terminal 2A serves as the reception side upon the data transmission and reception in the near mode, and the terminal 2B serves as the transmission side. At Step S401, the terminal 2B searches near mode-compatible terminals. In order to enable the search of the near mode-compatible terminal, the terminal 2A transmits information indicating the near mode-compatible terminal. For example, in a case where the near-field wireless communication circuit 10 included in the terminal 2A is the UWB communication circuit, identification information which indicates the near mode-compatible terminal may be included in the header 74 or the payload 75 of the beacon signal 72 shown in FIG. 9. The terminal 2A may transmit the identification information which indicates the near mode-compatible terminal in response to a query signal from the terminal 2B, or may voluntarily transmit it at constant intervals.

At Step S402, the terminal 2B outputs information on a group of terminals found by the search to the display unit 14. Then, the terminal 2B accepts, by the operation accepting unit 15, operation for selecting a terminal to be wirelessly connected thereto from among the group of terminals found by the search. At Step S101, the terminal 2B connects in the normal mode to the selected terminal (2A). Note that operation of the terminals 2A and 2B at Steps S101 to S107 in FIG.

13 may be similar to that of the terminals 1A and 1B at the corresponding Steps described in FIG. 5.

Third Exemplary Embodiment of the Invention

Figure 14:
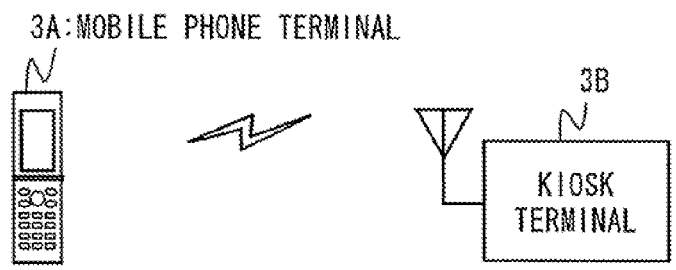
FIG. 14 is a configuration diagram of a wireless communication system according to a third exemplary embodiment of the present invention.

FIG. 14 shows configuration of a wireless communication system according to this exemplary embodiment. The wireless communication system according to this exemplary embodiment includes a mobile phone terminal 3A and a kiosk terminal 3B which conduct near-field wireless communication. As with the above-mentioned terminals 1A and 1B, each of the terminals 3A and 3B can switch its operation mode between the normal mode for conducting the near-field wireless communication (e.g., within about 10 meters) and the near mode for conducting the wireless communication in the nearer area (e.g., within several centimeters) as compared with that in the normal mode. The mobile phone terminal 3A performs acquisition of content and an encryption key (reproduction key) for reproducing the content from the kiosk terminal 3B by using the near mode. For example, the content is moving image data, still image data, or an application program which can be used in the mobile phone terminal 3A.

Figure 15:
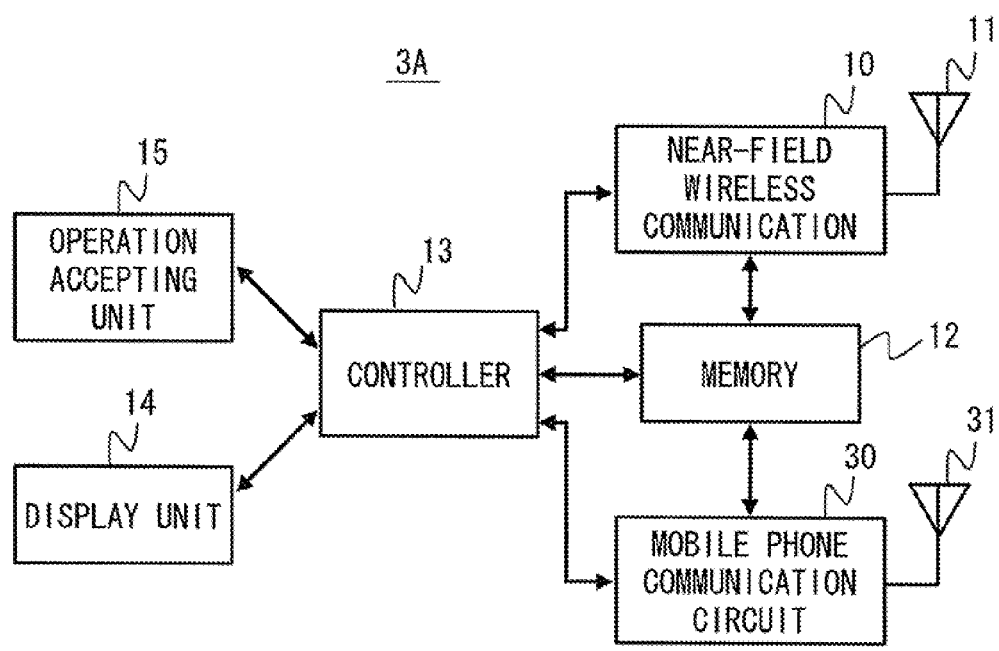
FIG. 15 is a block diagram showing a configuration example of a terminal shown in FIG. 14.

FIG. 15 is a block diagram showing a configuration example of the mobile phone terminal 3A. In FIG. 15, a mobile phone communication circuit 30 connects through an antenna 31 to a base station arranged in a mobile phone communication network. Other components shown in FIG. 15 may be similar to those shown in FIG. 2, and thus their duplicated explanation is omitted. Further, the configuration of the kiosk terminal 3B may be similar to that of each of the terminals 1A and 1B shown in FIG. 2.

Figure 16:
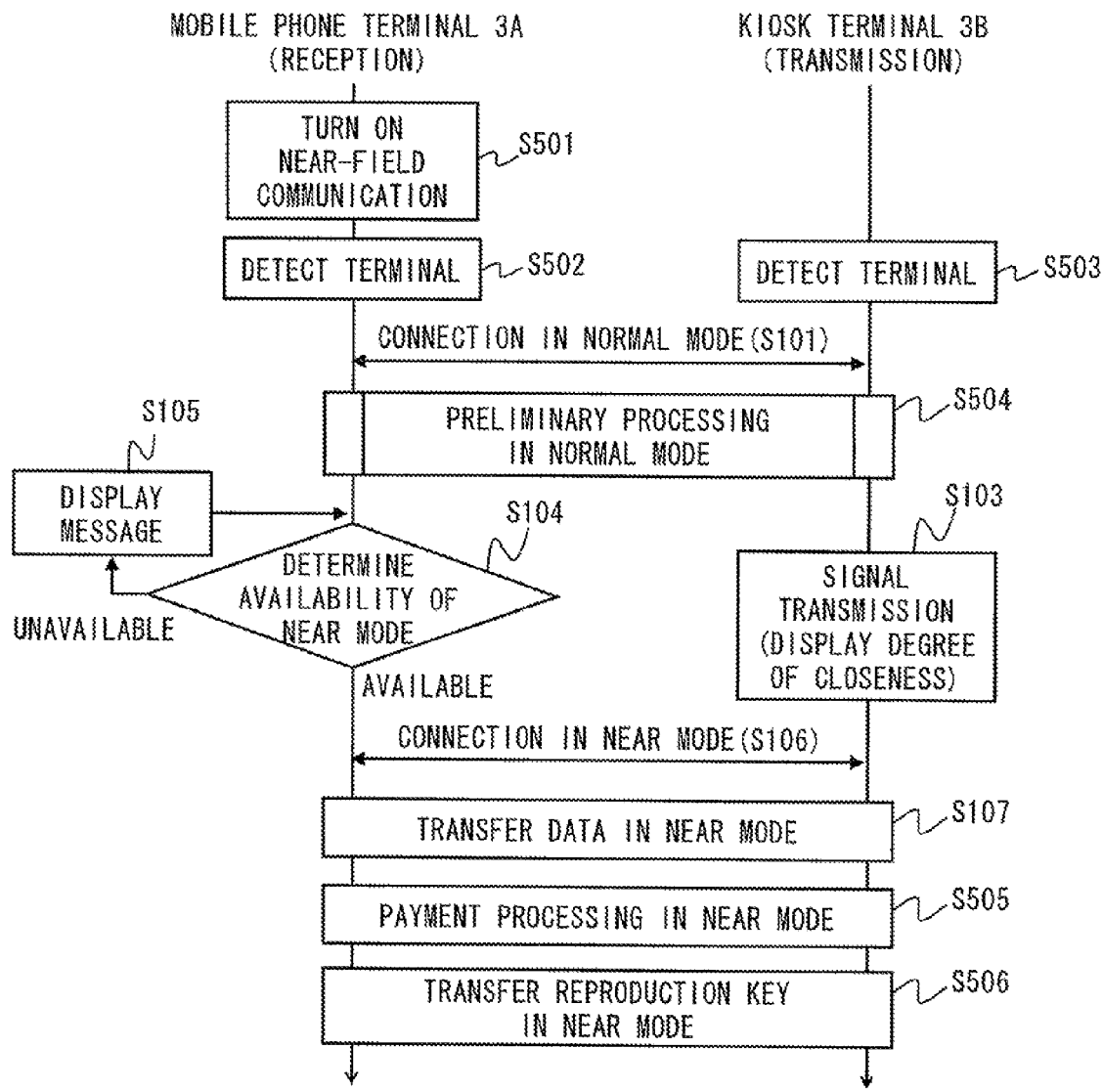
FIG. 16 is a sequence diagram on data transfer processing between terminals shown in FIG. 14.

Hereinafter, processing for data transmission and reception in the near mode performed between the mobile phone terminal 3A and the kiosk terminal 3B will be described in detail. FIG. 16 is a sequence diagram showing the processing for the data transmission and reception performed between the terminals 3A and 3B. Note that in FIG. 16, the mobile phone terminal 3A serves as the reception side upon data transfer in the near mode, and the kiosk terminal 3B serves as the transmission side.

At step S501 in FIG. 16, the mobile phone terminal 3A starts the operation of the near-field wireless communication circuit 10. The operation of the near-field wireless communication circuit 10 may be started in response to operation by the user. The kiosk terminal 3B may be in an operating, state where the near-field communication can be constantly available, in order to accept connection with the near mode-compatible terminal such as the mobile phone terminal 3A. At Steps S502 and S503, the terminals 3A and 3B mutually detect the opposite terminal.

At Step S101 in FIG. 16, the terminals 3A and 3B connect in the normal mode to each other by using the respective near-field wireless communication circuits 10, based on the control by the respective controllers 13 included therein. At Step S504, the terminals 3A and 3B perform, in the normal mode, preliminary processing on data transmission and reception in the near mode (Step S107) which will be performed later.

Figure 17:
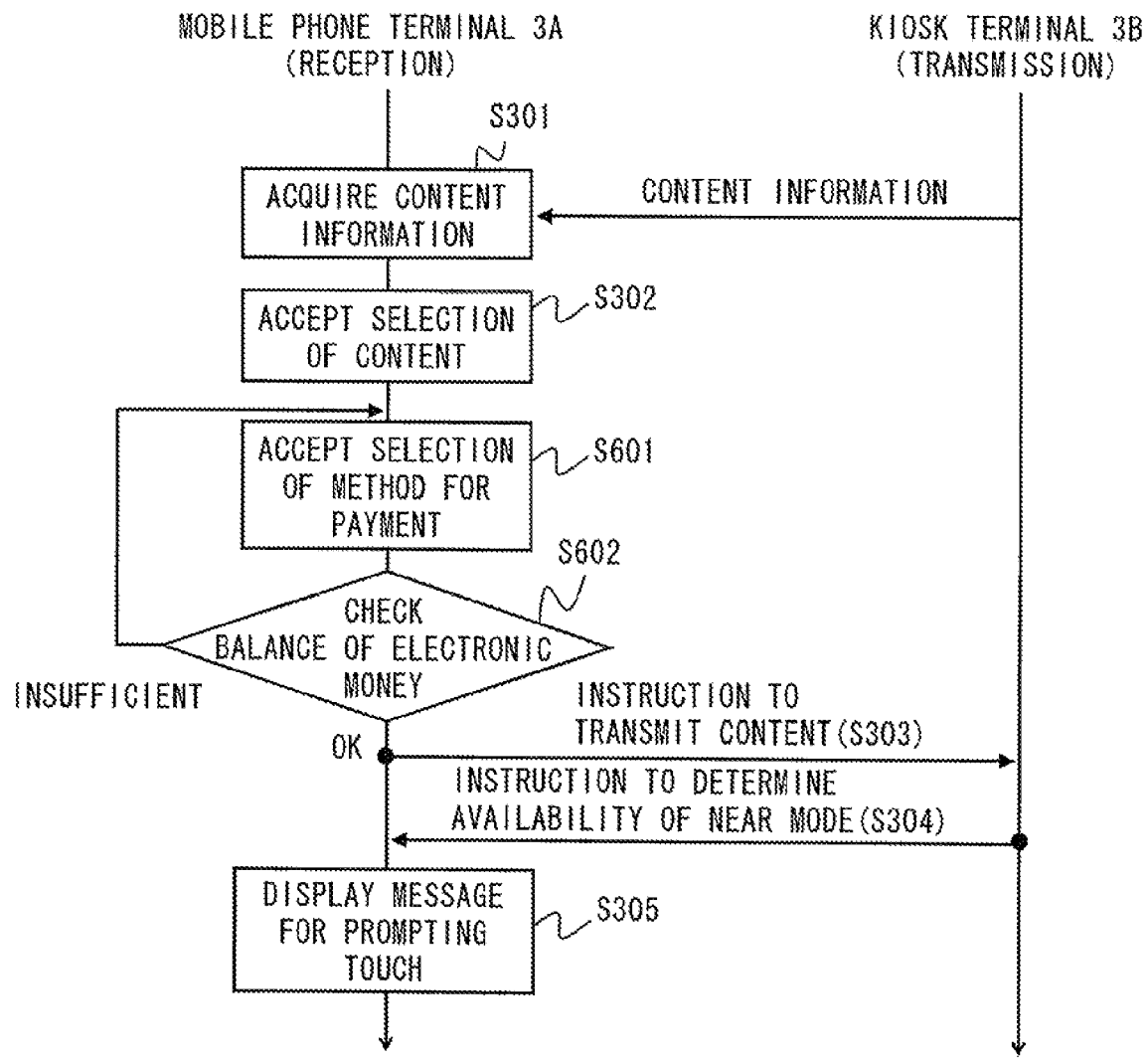
FIG. 17 is a sequence diagram showing an example of preliminary processing which is included in the data transfer processing shown in FIG. 16.

FIG. 17 is a sequence diagram showing a specific example of the preliminary processing performed at Step S504. Note that in FIG. 17, processes at Steps S601 and S602 are added to the example of the preliminary processing shown in FIG. 7. At Step S601, the terminal 3A accepts selection operation of a method for payment by the user. For example, a method for paying the purchase price of the content may be selected from among electronic money payment and other methods for the payment (credit card, cash, or the like). Further, among plural pieces of electronic money, there may be selected the one for using the payment of the purchase price.

At Step S602, in a case where the payment by the electronic money is selected, the purchase price of the content is compared to balance of the electronic money, and thus it is checked whether or not the balance of the electronic money is sufficient. When the balance of the electronic money is sufficient (OK at Step S602), Step S303 and the subsequent Steps are carried out. On the other hand, when the balance of the electronic money is insufficient, the selection of the method for the payment may be accepted again by returning to Step S302.

Returning to FIG. 16, the description is continued. Operation of the terminals 3A and 3B at Steps S103 to S107 may be similar to that of the terminals 1A and 1B at the corresponding Steps described in FIG. 5. Note that at Step S107, content data held by the kiosk terminal 3B is transferred to the terminal 3A.

At Step S505, electronic payment processing is performed in the near mode between the terminals 3A and 3B. For example, in a case where information on remaining amount of the electronic money is stored in the memory 12 of the mobile phone terminal 3A, there may be performed a process to subtract the amount equivalent to the price of the content from the remaining amount of the electronic money held by the mobile phone terminal 3A. Further, there may be configured so that an external payment server (not shown) performs the payment processing. Specifically, user information, credit card information and the like, which are stored in the memory 12 of the mobile phone terminal 3A, may be transmitted from the mobile phone terminal 3A to the kiosk terminal 3B and transferred from the kiosk terminal 3B to the external payment server (not shown), and then the payment processing may be performed by the payment server (not shown). Further, the kiosk terminal 3B may receive notification indicating completion of the payment from the payment server, and may transfer the notification to the mobile phone terminal 3A.

At Step S506, under a condition where the payment processing is normally completed, the kiosk terminal 3B transmits the encryption key required for reproducing and executing the content to the mobile phone terminal 3A.

The wireless communication system according to this exemplary embodiment performs the delivery of the encryption key (reproduction key) for using the content in the near mode. In the near mode, the communicable range is limited. Therefore, the wireless communication system according to this exemplary embodiment can prevent the reproduction key from being leaked to a third person due to impersonation or eavesdropping. The wireless communication system according to this exemplary embodiment is available as a system for selling contents such as music data and video data, for example, by arranging the kiosk terminal in a store.

In the description mentioned above, it has been assumed that the terminal 3A is the mobile phone terminal. Meanwhile, the terminal 3A may be a different terminal such as a portable music and video player which includes a function of reproducing the content.

Further, the payment processing in FIG. 16 may be performed by a terminal for payment, which is different from the kiosk terminal 3B. In this case, the transfer of the reproduction key may be performed in the near mode between the terminal 3A and the terminal for payment. Further, the payment processing in FIG. 16 may be replaced by a normal payment with the credit card or the cash. In this case, the transfer of the reproduction key may be performed in the near mode between e.g. a POS (Point-of-Sale) register and the terminal 3A.

Fourth Exemplary Embodiment of the Invention

A wireless communication system according to this exemplary embodiment includes terminals 4A and 4B which conduct near-field wireless communication. The terminals 4A and 4B perform, in the near mode, exchange of a connection key associated with authentication of the opposite terminal. Note that configuration of the terminals 4A and 4B may be similar to that of the terminals 1A and 1B described in the first exemplary embodiment of the invention.

Figure 18:
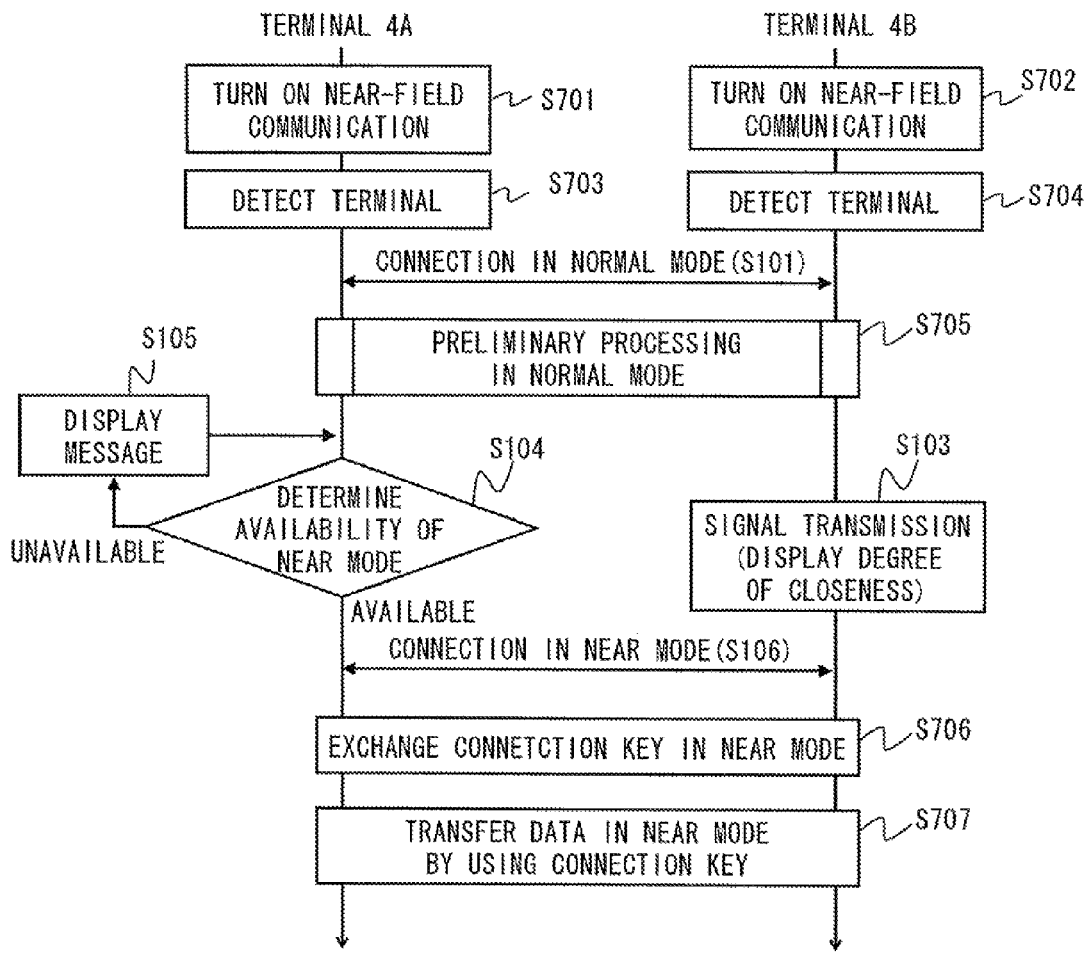
FIG. 18 is a sequence diagram on data transfer processing in a wireless communication system according to a fourth exemplary embodiment of the present invention.

FIG. 18 is a sequence diagram showing processing for data transmission and reception performed between the terminals 4A and 4B. At Steps S701 and S702, the terminals 4A and 4B start the operation of the respective near-field wireless communication circuits 10. At Steps S703 and S704, the terminals 4A and 4B mutually detect the opposite terminal.

At Step S101 shown in FIG. 18, the terminals 4A and 4B connect in the normal mode to each other by using the respective near-field wireless communication circuits 10, based on the control by the respective controllers 13 included therein. At Step S705, the terminals 4A and 4B perform, in the normal mode, preliminary processing on data transmission and reception in the near mode (Step S707) which will be performed later.

Figure 19:
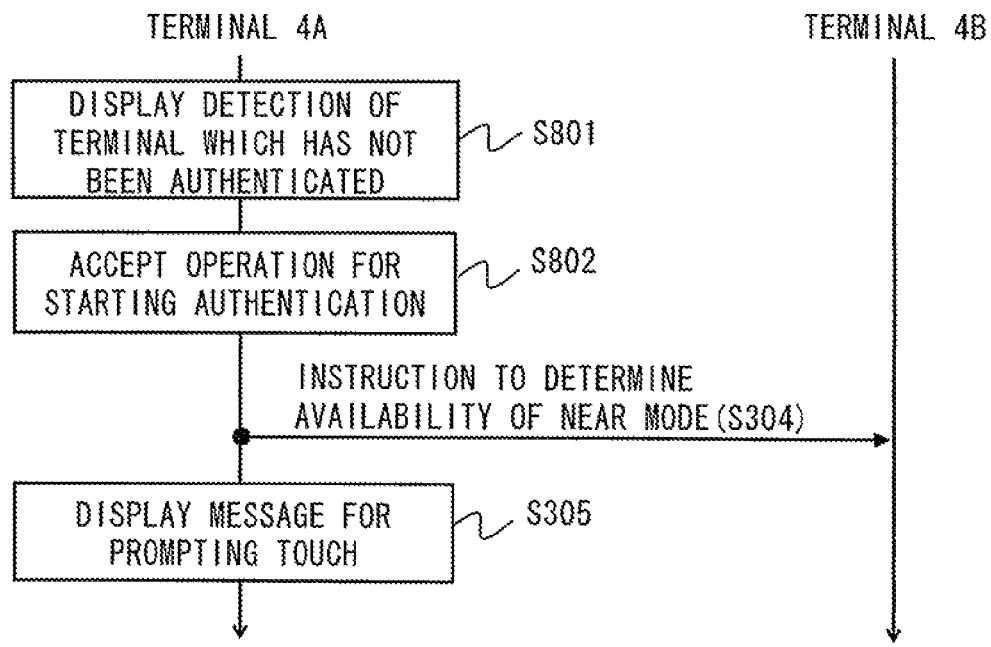
FIG. 19 is a sequence diagram showing an example of preliminary processing which is included in the data transfer processing shown in FIG. 18.

FIG. 19 is a sequence diagram showing a specific example of the preliminary processing performed at Step S705. At Step S801, the terminal 4A displays on the display unit 14 detection of terminals (including the terminal 4B) which have not been authenticated. At Step S802, the terminal 4A accepts, through the operation accepting unit 15, operation for instructing to start authentication of the terminal 4B. At Step S304, the terminal 4A transmits an instruction signal for starting the determination of the availability of the near mode to the terminal 4B, in response to the instruction to start the authentication of the terminal 4B. The terminal 4B, which has received the instruction signal, may start preparation for the signal transmission at Step S103. At Step S305, the terminal 4A outputs the message for prompting the touch to the display unit 14. Note that although FIG. 19 shows that Steps S801, S802 and S304 are performed by the terminal 4A, it is obvious that these processes may be performed by the terminal 4B.

Returning to FIG. 18, the description is continued. Operation of the terminals 4A and 4B at Steps S103 to S106 may be similar to that of the terminals 1A and 1B at the corresponding Steps described in FIG. 5.

At Step S706, the terminals 4A and 4B perform the exchange of connection key in the near mode. For this key exchange, a key-exchange algorithm such as a Diffie-Hellman method may be used. At Step S707, the terminals 4A and 4B perform data transfer in the near mode by using the connection key shared at Step S706 between the terminals 4A and 4B.

The wireless communication system according to this exemplary embodiment performs, in the near mode, the processing for authenticating the communication destination terminal to exchange the connection key. In the near mode, the communicable range is limited. Therefore, the wireless communication system according to this exemplary embodiment can prevent the connection key from being leaked to a third person due to impersonation or eavesdropping. Further, it is possible to complete the authentication of the communication destination terminal by the touch operation, which is intuitive and simple for the user. Note that it is obvious that the procedure of the terminal authentication described in this exemplary embodiment may be used by combining it with the above-mentioned first to third exemplary embodiments of the invention, or with fifth and sixth exemplary embodiments of the invention which will be described later.

Fifth Exemplary Embodiment of the Invention

Figure 20:
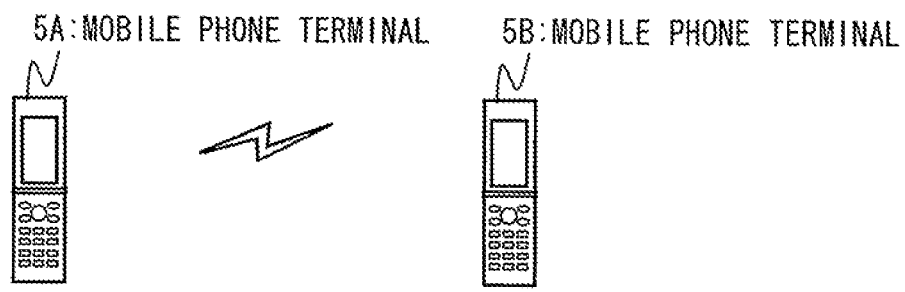
FIG. 20 is a configuration diagram of a wireless communication system according to a fifth exemplary embodiment of the present invention.

FIG. 20 shows configuration of a wireless communication system according to this exemplary embodiment. The wireless communication system according to this exemplary embodiment includes mobile phone terminals 5A and 5B which conduct near-field wireless communication. As with the above-mentioned terminals 1A and 1B, each of terminals 5A and 5B can switch its operation mode between the normal mode for conducting the near-field wireless communication (e.g., within about 10 meters) and the near mode for conducting wireless communication in the nearer area (e.g., within several centimeters) as compared with that in the normal mode. The terminal 5B can execute an application program (mailer) for e-mail transmission and reception. Upon transmitting an e-mail generated by using the mailer to the terminal 5A, the terminal 5B performs switching between transmission through a mobile phone communication network and transmission directly to the terminal 5A by use of the near-field wireless communication (near mode).

Figure 21:
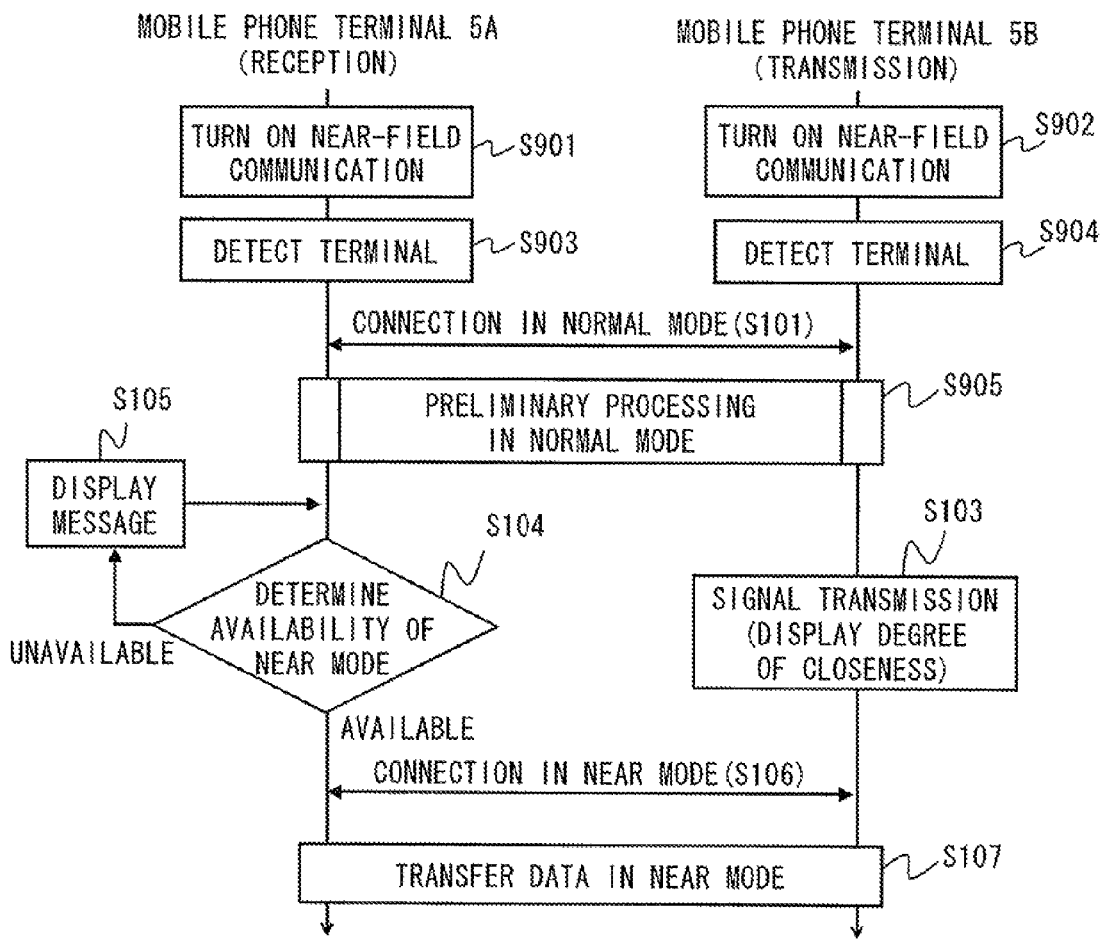
FIG. 21 is a sequence diagram on data transfer processing between terminals shown in FIG. 20.

Hereinafter, processing for data transmission and reception in the near mode performed between the mobile phone terminals 5A and 5B will be described in detail. FIG. 21 is a sequence diagram showing the processing for data transmission and reception performed between the terminals 5A and 5B. Note that in FIG. 21, the terminal 5A serves as the reception side upon data transfer in the near mode, and the terminal 5B serves as the transmission side.

At Steps S901 and S902, the terminals 5A and 5B start the operation of the respective near-field wireless communication circuits 10. At Steps S903 and S904, the terminals 5A and 5B mutually detect the opposite terminal.

At Step S101 shown in FIG. 21, the terminals 5A and 5B connect in the normal mode to each other by using the respective near-field wireless communication circuits 10, based on the control by the respective controllers 13 included therein. At Step S905, the terminals 5A and 5B perform, in the normal mode, preliminary processing on data transmission and reception in the near mode (Step S107) which will be performed later.

Figure 22:
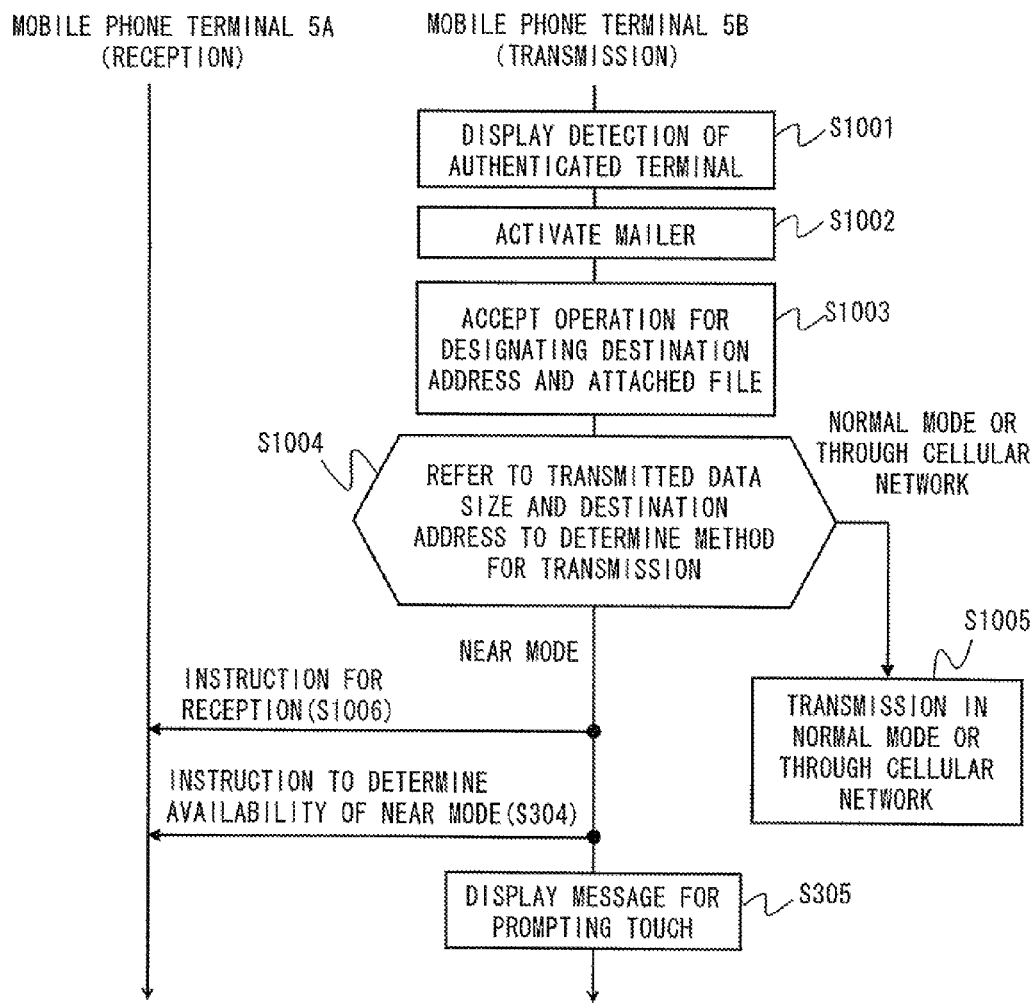
FIG. 22 is a sequence diagram showing an example Of preliminary processing which is included in the data transfer processing shown in FIG. 21.

FIG. 22 is a sequence diagram showing a specific example of the preliminary processing performed at Step S905. At Step S1001, the terminal 5B displays on the display unit 14 detection of the authenticated terminal 5A. Note that in a case where the terminal 5A has not been approved, authentication processing for the terminal 5A may be executed. The procedure of the authentication mentioned in the forth exemplary embodiment of the invention may be used for this authentication processing. Further, when the terminal 5B authenticates the terminal 5A, it may store a phone number and an e-mail address allocated to the terminal 5A, and information for identifying the terminal 5A such as a name or a nickname of the user in association with the connection key exchanged upon the authentication. Thus, when the authenticated terminal 5A is detected, it is possible to notify the user of the terminal 5A being the authenticated one and of the information on the user (phone number, e-mail address) by outputting them to the display unit 14.

At Step S1002, the terminal 5B activates the mailer in response to the operation by the user. At Step S1003, the terminal 5B accepts, through the operation accepting unit 15, operation for designating a destination e-mail address and a data file attached to a mail to be transmitted.

At Step S1004, the terminal 5B determines a path for transmitting the e-mail in response to operation by the user for instructing transmission. Mentioned in more detail, the terminal 5B determines to transmit the e-mail through the mobile phone communication network (cellular network), if the size of transmitted data is equal to or smaller than a predetermined data size. Note that if the size of transmitted data is equal to or smaller than the predetermined data size, it may be determined whether or not the destination of the e-mail is a terminal which can conduct the near-field wireless communication. If the destination of the e-mail is the terminal which can conduct the near-field wireless communication, it may be determined to transmit the e-mail in the normal mode (Step S1005).

On the other hand, if the size of transmitted data exceeds the predetermined data size and the destination of the e-mail is the terminal which can conduct the near-field wireless communication, the terminal 5B determines to transmit the e-mail in the near mode. In this case, the terminal 5B transmits an instruction for reception in the near mode to the terminal 5A. Operation at Steps S304 and S305 in FIG. 22 is similar to that mentioned hereinbefore.

As mentioned above, the wireless communication system according to this exemplary embodiment selects, depending on the size of transmitted data, a path for data transmission from among a plurality of candidates (mobile phone communication network, near-field wireless (normal mode), and near-field wireless (near mode)). Therefore, it is possible to select an appropriate path for the data transmission according to the amount of transmitted data.

Sixth Exemplary Embodiment of the Invention

Figure 23:
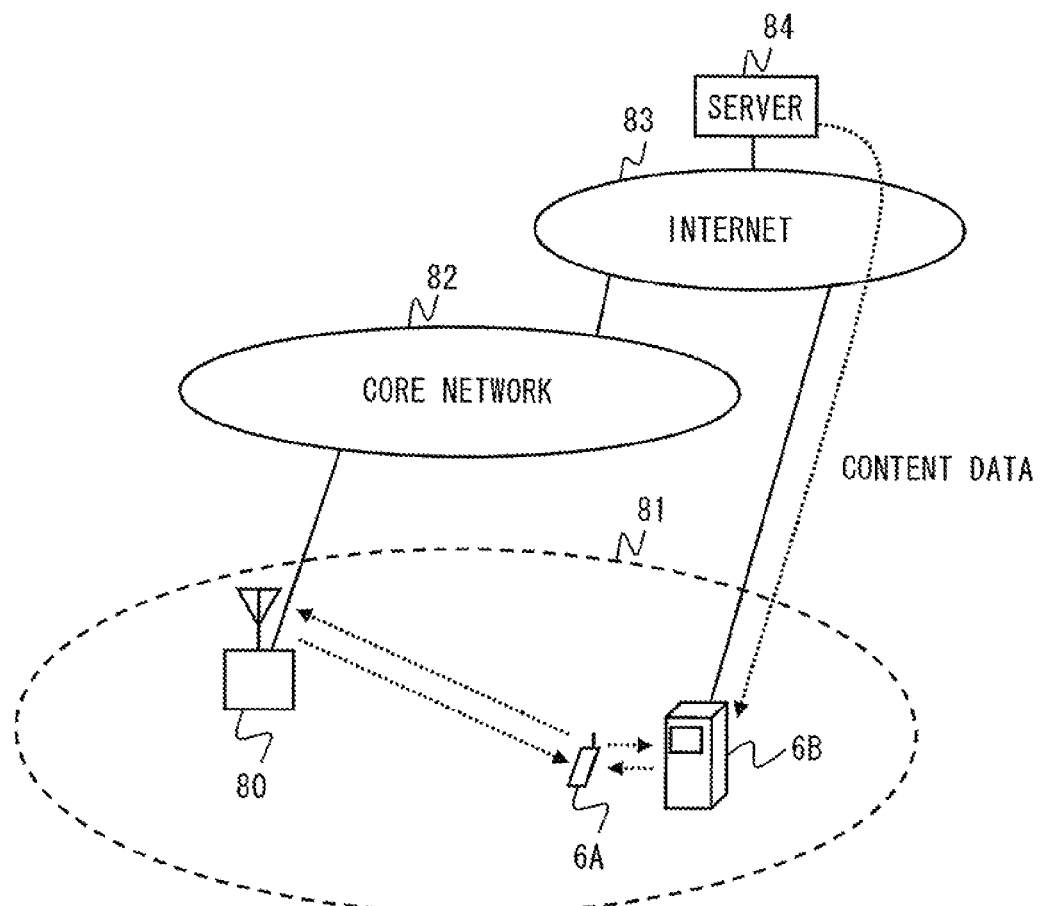
FIG. 23 is a configuration diagram of a wireless communication system according to a sixth exemplary embodiment of the present invention.

FIG. 23 shows configuration of a wireless communication system according to this exemplary embodiment. The wireless communication system according to this exemplary embodiment includes a mobile phone terminal 6A and a kiosk terminal 6B which can conduct near-field wireless communication. Furthermore, the wireless communication system according to this exemplary embodiment includes a mobile phone communication network and a server 84. FIG. 23 shows a base station 80 and a core network 82 which is connected to the base station 80, as an example of elements included in the mobile phone communication network.

The mobile phone terminal 6A and the kiosk terminal 6B are located in a cell 81 formed by the base station 80. The server 84 is connected to the core network 82 through the Internet 83. The server 84 can be accessed from the mobile phone terminal 6A through the mobile phone communication network. Further, the server 84 can communicate with the kiosk terminal 6B for the purpose of delivering content data. In order to suit the delivery of the content data, the kiosk terminal 6B and the server 84 may be connected by a higher-speed line as compared with a radio channel between the base station 80 and the mobile phone terminal 6A. For example, the kiosk terminal 6B may connect to the Internet 83 by using an ADSL (Asymmetric Digital Subscriber Line) or an optical fiber line, each of which is provided by a carrier.

Note that the arrangement of the server 84 shown in FIG. 23 is no more than an example. The server 84 has only to be capable of being accessed from the mobile phone terminal 6A through the mobile phone communication network, and of communicating with the kiosk terminal 6B. For example, the server 84 may be arranged as equipment of a mobile phone carrier in the mobile phone communication network. Further, the server 84 may be a collection of plural computers. For example, a computer which accepts access from the mobile phone terminal 6A, a computer which delivers the content, and a computer which performs the payment processing may be the individual ones.

Figure 24:
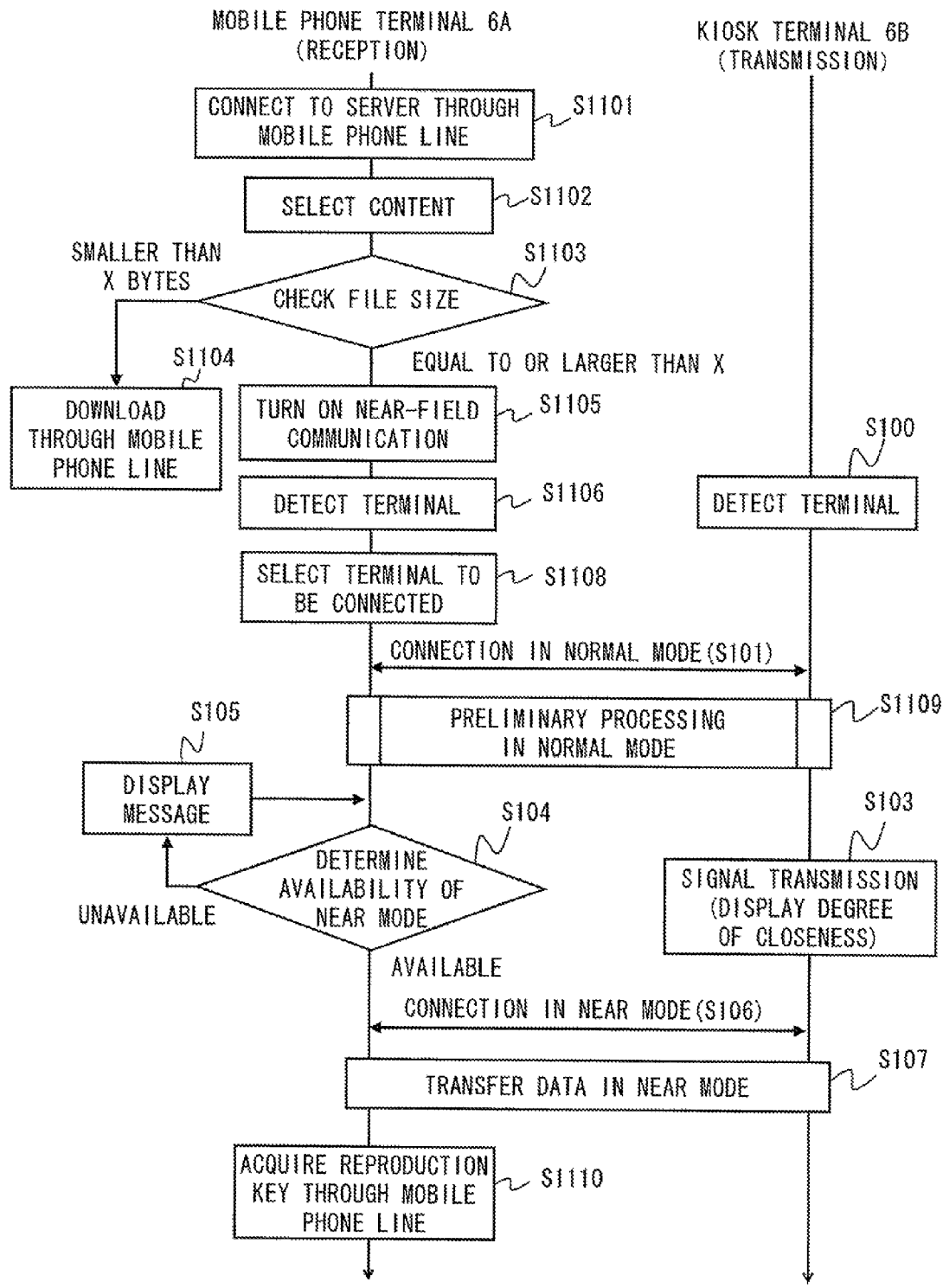
FIG. 24 is a sequence diagram on data transfer processing between terminals shown in FIG. 23.

Hereinafter, there will be described transfer processing for the content data in the near mode, which is executed between the mobile phone terminal 6A and the kiosk terminal 6B. FIG. 24 is a sequence diagram showing processing for data transmission and reception executed between the terminals 6A and 6B. Note that in FIG. 24, the terminal 6A serves as the reception side upon data transfer in the near mode, and the terminal 6B serves as the transmission side.

At Step S1101, the mobile phone terminal 6A accesses the server 84 through the mobile phone communication network. At Step S1102, the mobile phone terminal 6A accepts, through the operation accepting unit 15, operation for selecting content to be downloaded from the server 84. At Step S1103, the terminal 6A checks a file size of the content selected as the object of download. When the file size is smaller than a predetermined value (X bytes), the mobile phone terminal 6A determines to download the content through the mobile phone communication network (Step S1104).

On the other hand, when the file size is equal to or larger than the predetermined value (X bytes), the mobile phone terminal 6A determines to download the content by using the near-field wireless communication in the near mode with the kiosk terminal 6B. In this case, the mobile phone terminal 6A starts the operation of the near-field wireless communication circuit 10 (Step-S1105).

At Steps S1106 and S1107, the mobile phone terminal 6A and the kiosk terminal 6B mutually detect the opposite terminal. At Step S1108, the mobile phone terminal 6A outputs information on a group of terminals detected at Step S1106 to the display unit 14. Then, the mobile phone terminal 6A accepts, by the operation accepting unit 15, operation for selecting a terminal to be wirelessly connected from among the detected group of terminals. At Step S101 in FIG. 24, the mobile phone terminal 6A connects in the normal mode to the selected terminal (kiosk terminal 6B).

Figure 25:
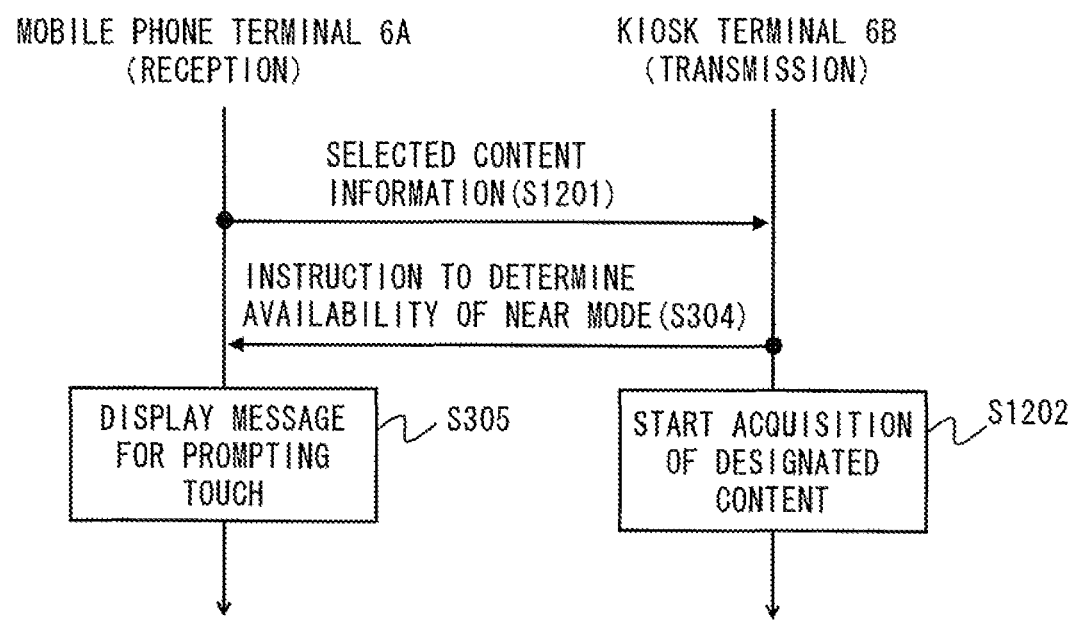
FIG. 25 is a sequence diagram showing an example of preliminary processing which is included in the data transfer processing shown in FIG. 24.

At Step S1109, the mobile phone terminal 6A and the kiosk terminal 6B perform, in the normal mode, preliminary processing on data transmission and reception in the near mode (Step S107) which will be executed later. FIG. 25 is a sequence diagram showing a specific example of the preliminary processing performed at Step S1109. At Step S1201 in FIG. 25, the mobile phone terminal 6A transmits information on the content selected as the object of download to the kiosk terminal 6B. At Step S304 in FIG. 25, the kiosk terminal 6B transmits to the mobile phone terminal 6A an instruction to start the determination of the availability of the near mode. At Step S305, the mobile phone terminal 6A outputs the message for prompting the touch to the display unit 14. The message may be displayed on the kiosk terminal 6B.

At Step S1202, the kiosk terminal 6B starts preliminary acquisition of the content designated as the object of download from the server 84. That is, the kiosk terminal GB starts the acquisition of the content from the server 84 based on the content information obtained in the process of the preliminary processing, in advance of start of transmitting the content in the near mode at the subsequent Step S107. Note that the process at may be performed before Step S304 or in parallel with the process at S304.

Returning to FIG. 24, the description is continued. Operation of the terminals 6A and 6B at Steps S103 to S106 in FIG. 24 may be similar to that of the terminals 1A and 1B at the corresponding Steps described in FIG. 5. At Step S107 in FIG. 24, the content is transmitted in the near mode from the kiosk terminal 6B to the mobile phone terminal 6A.

Finally, at Step S1110, the mobile phone terminal 6A acquires an encryption key (reproduction key) required for using (e.g., reproducing and viewing) the content through the mobile phone communication network. Note that the server 84 may perform processing for charging and authenticating the user, and thus may transmit the reproduction key only when it is determined that the user of the mobile phone terminal 6A has the authority to use the content. The server 84 may corporate with an accounting server of the mobile phone carrier, so that the charge of the content can be sent together with mobile phone charges. Further, the mobile phone terminal 6A may acquire the reproduction key from the kiosk terminal 6B.

By use of the wireless communication system according to this exemplary embodiment, the mobile phone carrier can avoid an increase in traffic flowing across the mobile phone communication network. The mobile phone carrier can also earn sales of the content in addition to the charge of the mobile phone terminal 6A, by comprehensively operating the server 84 and the kiosk terminal 6B. Further, the mobile phone terminal 6A can acquire the content at high speed in a short time through the kiosk terminal 6B. Therefore, it is possible to reduce electric power required for acquiring the content.

Note that in the above description of this exemplary embodiment, there have been described the case where the content is downloaded from the server 84 to the mobile phone terminal 6A. Meanwhile, this exemplary embodiment can be also applied to an upload of large-volume data from the mobile phone terminal 6A to the server 84. For the upload to the server 84, the direction of the data transmission and reception at Steps S1104 and S107 may be reversed.

By the way, the control of the processing for the data transmission and reception which is executed mainly by the controller 13 described in each of the first to sixth exemplary embodiments of the invention, in other words, the control of the terminals for executing the data transmission and reception in the near mode after performing the preliminary processing in the normal mode can be materialized by causing a computer such as a microprocessor to execute a control program. Specifically, the processes in each terminal shown in FIGS. 5, 6, 7, 13, 16 to 19, 21, 22, 24 and 25 may be executed by the computer. The control program can be stored in various types of storage media, and can be transmitted through communication media. Examples of the storage media include a flexible disk, a hard disk, a magnetic disk, a magnet-optical disk, a CD-ROM, a DVD, a ROM cartridge, a RAM memory cartridge with battery backup, a flash memory cartridge, and a nonvolatile RAM cartridge. Further, the communication media include a wired communication medium such as a telephone line, a wireless communication medium such as a microwave line, and the Internet.

Further, in the above-mentioned first to sixth exemplary embodiments, the mobile phone terminal, the kiosk terminal, and the portable music and video player are shown as specific examples of the wireless communication terminal. Meanwhile, it is obvious that the wireless communication terminal, which performs the preliminary processing in the normal mode and performs the data transmission and reception in the near mode, is not limited to the above-described specific examples. For example, the wireless communication terminal described in each exemplary embodiment may be a computer device such as a PC (personal computer) or a PDA, or may be a data recording device such as an HD (Hard Disc) recorder.

Furthermore, the present invention is not limited to only the above-mentioned exemplary embodiments, and it is obvious that various modifications can be made without departing from the scope of the present invention which has been already mentioned.

According to each of the above-mentioned exemplary embodiments of the present invention, it is possible to achieve the following effects. That is, it is possible to perform preliminary processing with input operation by a user, by using a near field wireless communication circuit (for example, the near-field wireless communication circuit 10) which is set to a first communication mode (for example, the normal mode). In the first communication mode, a communicable distance is longer than that in a second communication mode (for example, the near mode) for performing data transmission and reception in a near area. Therefore, it is not necessary for the user to move one of wireless communication devices (for example, the terminals 1A and 1B) too closer to another upon performing the preliminary processing.

REFERENCE SIGNS LIST 1A, 1B, 2A, 2B, 4A, 4B TERMINAL
3A, 5A, 5B, 6A MOBILE PHONE TERMINAL
3B, 6B KIOSK TERMINAL
10 NEAR-FIELD WIRELESS COMMUNICATION CIRCUIT
11 ANTENNA
12 MEMORY
13 CONTROLLER
14 DISPLAY UNIT
15 OPERATION ACCEPTING UNIT
100 ANALOG FRONT END (AFE)
101 A/D CONVERTER (ADC)
102 FFT UNIT
103 DE-MAPPER
104 DECODER
105 MAC UNIT
106 CODER
107 MAPPER
108 IFFT UNIT
109 D/A CONVERTER (DAC)
30 Mobile Phone Communication Circuit
31 ANTENNA
40 TRANSMISSION FRAME
41 PREAMBLE AND HEADER
42 PAYLOAD
71, 72 BEACON SIGNAL
73 PREAMBLE
74 HEADER
75 PAYLOAD
76 TEST SIGNAL
77 TRANSMISSION DATA SIGNAL
80 BASE STATION
81 CELL
82 CORE NETWORK
83 INTERNET
84 SERVER

The invention claimed is:

1. A wireless communication device comprising:
a near field wireless communication circuit capable of performing switching between a first communication mode and a second communication mode that has a relatively short communicable distance and a relatively high transmission rate as compared with a communicable distance and a transmission rate of the first communication mode; and
a controller that controls the switching between the first and second communication modes, wherein the controller is configured to:
negotiate, with a communication destination device through the near field wireless communication circuit that is set to the first communication mode, to execute preliminary processing to satisfy or designate a condition for starting data transmission and reception in the second communication mode to/from the communication destination device;
determine an availability of the data transmission and reception in the second communication mode to/from the communication destination device by using a measured value of communication quality that has a correlation with a communication distance to the communication destination device as a measure of the determination; and
start, when it is determined that the data transmission and reception are available and when the condition is satisfied or designated as a result of the preliminary processing, the data transmission and reception by using the near field wireless communication circuit that is set to the second communication mode,
wherein the preliminary processing includes at least one of displaying a message to a user of the wireless communication device and accepting input operation by the user,
wherein the controller is further configured to determine that the condition is satisfied or designated when at least one of the following conditions is met:
a condition that the message is displayed to the user; and
a condition that the input operation is accepted.

2. The wireless communication device according to claim 1, wherein in the determination of the availability of the data transmission and reception, the controller starts measurement of communication quality in the first communication mode, makes the transition to measurement of communication quality in the second communication mode according to satisfaction of predetermined criteria by the communication quality in the first communication mode, and determines that the data transmission and reception are available when the communication quality in the second communication mode meets predetermined criteria.

3. The wireless communication device according to claim 1, wherein in the determination of the availability of the data transmission and reception, the controller operates the near field wireless communication circuit so as to perform the switching between the first communication mode and the second communication mode in a time-division manner, and performs the measurement of the communication quality in the second communication mode, while transmitting and receiving a beacon signal in the first communication mode to retain synchronization with the communication destination device.

4. The wireless communication device according to claim 3, wherein the beacon signal includes designation of a transmission period of a wireless signal in the second communication mode from the communication destination device,
wherein the controller performs the measurement of the communication quality in the second communication mode during the transmission period designated by the beacon signal.

5. The wireless communication device according to claim 3, wherein upon performing the data transmission and reception, the controller transmits the beacon signal in the first communication mode, and transmits or receives target data of the data transmission and reception in the second communication mode.

6. The wireless communication device according to claim 3, wherein upon performing the data transmission and reception, the controller switches the communication mode for transmitting and receiving the beacon signal from the first communication mode to the second communication mode.

7. The wireless communication device according to claim 1, wherein the controller performs a search of a device that can communicate in the second communication mode by using the near field wireless communication circuit that is set to the first communication mode.

8. The wireless communication device according to claim 7, further comprising:
a far field wireless communication circuit for wirelessly connecting to a base station included in a mobile phone communication network; and
a determiner that conducts data communication through the far field wireless communication circuit with a server that can be accessed through the mobile phone communication network, and determines, according to a data size of content to be downloaded from the server, through which of wireless connection to the mobile phone communication network and near field wireless connection to the communication destination device to download the content,
wherein the controller performs the search of the device that can communicate in the second communication mode, according to the determination of the download through the near field wireless connection.

9. The wireless communication device according to claim 7, further comprising:
a display unit; and
an operation unit that accepts input operation by a user,
wherein the controller outputs information on at least one device detected by the search to the display unit, and accepts an instruction for designating the communication destination device from among the at least one device through the operation unit.

10. The wireless communication device according to claim 1, further comprising a second communication circuit that is different from the near field wireless communication circuit,
wherein the controller starts preliminary acquisition of target content of the data transmission and reception from a server that can be accessed through the second communication circuit, according to execution of the preliminary processing in the first communication mode or performance of the determination of the availability of the data transmission and reception.

11. The wireless communication device according to claim 1, further comprising a closeness degree display unit that displays a degree of closeness of the wireless communication device and the communication destination device,
wherein the controller changes a state of the display by the closeness degree display unit so as to indicate that the degree of closeness rises according to an upgrade of the communication quality.

12. The wireless communication device according to claim 1, wherein the preliminary processing includes at least one of:
(a) checking vacancy in a memory for reception of the communication destination device and displaying a result of the check to the user;
(b) removing data from the memory for reception to ensure a free space, the removing being performed with the input operation by the user;
(c) designating target content of the data transmission and reception, the designation being performed with the input operation by the user;

(d) making electronic payment with the input operation by the user; and (e) authenticating the communication destination device with the input operation by the user.

13. The wireless communication device according to claim 1, wherein the controller performs, in the second communication mode, exchange of a connection key for encrypting data to be transferred in the data transmission and reception between the wireless communication device and the communication destination device in advance of the start of the data transmission and reception.

14. The wireless communication device according to claim 1, wherein the communication quality includes at least one of an RSSI (Received Signal Strength Indicator), an LQI (Link Quality Indicator), and a symbol error rate.

15. The wireless communication device according to claim 1, wherein in the first communication mode, the average transmitted power is equal to or lower than −41.3 dBm/MHz and at least a first bandwidth of about 500 MHz included in a range from 3.1 GHz to 10.6 GHz is used, wherein in the second communication mode, the average transmitted power is equal to or lower than −70 dBm/MHz and a second bandwidth wider than the first bandwidth is used.

16. A wireless communication system comprising first and second communication devices, wherein each of the first and second communication devices includes a near field wireless communication circuit capable of performing switching between a first communication mode and a second communication mode that has a relatively short communicable distance and a relatively high transmission rate as compared with a communicable distance and a transmission rate of the first communication mode, wherein the first and second communication devices negotiate, with each other through the respective near field wireless communication circuits that are set to the first communication mode, to execute preliminary processing to satisfy or designate a condition for starting data transmission and reception in the second communication mode between the first and second communication devices, wherein the first communication device determines an availability of the data transmission and reception in the second communication mode to/from the second communication device by using a measured value of communication quality that has a correlation with a communication distance as a measure of the determination, wherein when it is determined that the data transmission and reception are available and when the condition is satisfied or designated as a result of the preliminary processing, the first and second communication devices start the data transmission and reception by using the respective near field wireless communication circuits that are set to the second communication mode, wherein the preliminary processing includes at least one of displaying a message to a user of the first communication device and accepting input operation by the user, wherein the first communication device determines that the condition is satisfied or designated when at least one of the following conditions is met:

a condition that the message is displayed to the user; and a condition that the input operation is accepted.

17. The wireless communication system according to claim 16, further comprising a server that can be accessed from one of the first and second communication devices through a mobile phone communication network, wherein the one communication device further comprises:

a far field wireless communication circuit for wirelessly connecting to a base station included in the mobile phone communication network; and a determiner that conducts data communication with the server through the far field wireless communication circuit, and determines, according to a data size of content to be downloaded from the server, through which of wireless connection to the mobile phone communication network and near field wireless connection to another of the first and second communication devices to download the content.

18. The wireless communication system according to claim 17, wherein the another of the first and second communication devices further comprises a second communication circuit that can communicate with the server not through the base station, wherein the another communication device starts preliminary acquisition of target content of the data transmission and reception from the server through the second communication circuit, according to execution of the preliminary processing in the first communication mode or performance of the determination of the availability of the data transmission and reception.

19. A method of controlling a wireless communication device, the device including a near field wireless communication circuit, the circuit being capable of performing switching between a first communication mode and a second communication mode that has a relatively short communicable distance and a relatively high transmission rate as compared with a communicable distance and a transmission rate of the first communication mode, the method comprising:

negotiating, with a communication destination device through the near field wireless communication circuit that is set to the first communication mode, to execute preliminary processing to satisfy or designate a condition for starting data transmission and reception in the second communication mode to/from the communication destination device; and starting, when the condition is satisfied or designated as a result of the preliminary processing, the data transmission and reception by using the near field wireless communication circuit that is set to the second communication mode, wherein the preliminary processing includes at least one of displaying a message to a user of the wireless communication device and accepting input operation by the user, wherein it is determined that the condition is satisfied or designated when at least one of the following conditions is met:

a condition that the message is displayed to the user; and a condition that the input operation is accepted.

20. A non-transitory computer readable medium storing a program, the program causing a computer to execute control processing for a wireless communication device, the device including a near field wireless communication circuit, the circuit being capable of performing switching between a first communication mode and a second communication mode that has a relatively short communicable distance and a relatively high transmission rate as compared with a communicable distance and a transmission rate of the first communication mode, wherein the control processing includes:

negotiating, with a communication destination device through the near field wireless communication circuit that is set to the first communication mode, to execute preliminary processing to satisfy or designate a condition for starting data transmission and reception in the second communication mode to/from the communication destination device; and causing, when the condition is satisfied or designated as a result of the preliminary processing, the near field wireless communication circuit that is set to the second communication mode to start the data transmission and reception, wherein the preliminary processing includes at least one of displaying a message to a user of the wireless communication device and accepting input operation by the user, wherein the control processing further includes determining that the condition is satisfied or designated when at least one of the following conditions is met:

a condition that the message is displayed to the user; and
a condition that the input operation is accepted.

21. A wireless communication device comprising:
a near field wireless communication circuit capable of performing switching between a first communication mode and a second communication mode that has a relatively short communicable distance and a relatively high transmission rate as compared with a communicable distance and a transmission rate of the first communication mode; and
a controller that controls the switching between the first and second communication modes,
wherein the controller is configured to:
negotiate, with a communication destination device through the near field wireless communication circuit that is set to the first communication mode, to execute preliminary processing to satisfy or designate a condition for starting data transmission and reception in the second communication mode to/from the communication destination device; and
start, when the condition is satisfied or designated as a result of the preliminary processing the data transmission and reception by using the near field wireless communication circuit that is set to the second communication mode, wherein the preliminary processing includes at least one of displaying a message to a user of the wireless communication device and accepting input operation by the user, wherein the controller is further configured to determine that the condition is satisfied or designated when at least one of the following conditions is met:

a condition that the message is displayed to the user; and
a condition that the input operation is accepted.

22. A wireless communication system comprising first and second communication devices,
wherein each of the first and second communication devices includes a near field wireless communication circuit capable of performing switching between a first communication mode and a second communication mode that has a relatively short communicable distance and a relatively high transmission rate as compared with a communicable distance and a transmission rate of the first communication mode, wherein the first and second communication devices negotiate, with each other through the respective near field wireless communication circuits that are set to the first communication mode, to execute preliminary processing to satisfy or designate a condition for starting data transmission and reception in the second communication mode between the first and second communication devices, wherein when the condition is satisfied or designated as a result of the preliminary processing, the first and second communication devices start the data transmission and reception by using the respective near field wireless communication circuits that are set to the second communication mode, wherein the preliminary processing includes at least one of displaying a message to a user of the first communication device and accepting input operation by the user, wherein the first communication device determines that the condition is satisfied or designated when at least one of the following conditions is met:

a condition that the message is displayed to the user; and
a condition that the input operation is accepted.

* * * * *